US008231760B2

(12) United States Patent
Murakami et al.

(10) Patent No.: US 8,231,760 B2
(45) Date of Patent: Jul. 31, 2012

(54) IMAGE REMOVING DEVICE, IMAGE REMOVING METHOD, AND IMAGE FORMING/REMOVING SYSTEM

(75) Inventors: Kakuji Murakami, Kanagawa (JP); Masatoshi Saitoh, Tokyo (JP); Toshiyuki Mutoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 972 days.

(21) Appl. No.: 12/244,193

(22) Filed: Oct. 2, 2008

(65) Prior Publication Data

US 2009/0097892 A1 Apr. 16, 2009

(30) Foreign Application Priority Data

Oct. 10, 2007 (JP) ................................. 2007-264428

(51) Int. Cl.
*B32B 38/10* (2006.01)

(52) U.S. Cl. ........ 156/711; 156/240; 156/715; 156/752; 156/759; 399/94

(58) Field of Classification Search .................. 156/235, 156/240, 711, 715, 716, 752, 759, 767; 399/94
See application file for complete search history.

(56) References Cited

U.S. PATENT DOCUMENTS

| | | | | |
|---|---|---|---|---|
| 4,330,194 | A | 5/1982 | Murakami | |
| 5,250,998 | A * | 10/1993 | Ueda et al. | 399/329 |
| 5,605,777 | A * | 2/1997 | Ando et al. | 430/124.15 |
| 5,607,534 | A | 3/1997 | Kawanishi et al. | |
| 5,619,765 | A | 4/1997 | Tokita et al. | |
| 5,638,842 | A * | 6/1997 | Tokita et al. | 134/104.1 |
| 5,643,380 | A | 7/1997 | Saitoh et al. | |
| 5,736,286 | A | 4/1998 | Kaneko et al. | |
| 5,769,957 | A | 6/1998 | Murakami et al. | |
| 5,782,254 | A | 7/1998 | Tanikawa et al. | |
| 5,968,301 | A | 10/1999 | Murakami et al. | |
| 7,283,758 | B2 | 10/2007 | Murakami | |
| 2004/0121254 | A1 * | 6/2004 | Nagayama et al. | 430/97 |

(Continued)

FOREIGN PATENT DOCUMENTS

JP 7-13383 1/1995

(Continued)

OTHER PUBLICATIONS

U.S. Appl. No. 08/643,456, filed May 8, 1996, Tetsuya Kaneko, et al.

(Continued)

*Primary Examiner* — Mark A Osele
(74) *Attorney, Agent, or Firm* — Oblon, Spivak, McClelland, Maier & Neustadt, L.L.P.

(57) ABSTRACT

A disclosed image removing device includes a roller peeling member onto which a recording material with the image forming substance having thermoplastic properties is superposed; a heating unit configured to heat the image forming substance; a pressurizing unit configured to apply pressure to the roller peeling member and the recording material superposed thereon to cause the image forming substance heated by the heating unit to adhere to the roller peeling member; a separating unit configured to separate the recording material from the roller peeling member after the image forming substance has adhered to the roller peeling member; and a removing unit configured to remove, from the roller peeling member, the image forming substance that has been transferred from the recording material to the roller peeling member. The removing unit is driven in such a manner that the removing unit and the roller peeling member pressurize/contact/slide against each other.

10 Claims, 10 Drawing Sheets

U.S. PATENT DOCUMENTS

| | | | | |
|---|---|---|---|---|
| 2006/0062997 | A1 * | 3/2006 | Murakami | 428/341 |
| 2006/0204302 | A1 | 9/2006 | Murakami | |
| 2007/0283980 | A1 | 12/2007 | Okamoto et al. | |
| 2007/0295363 | A1 | 12/2007 | Fuchigami et al. | |

FOREIGN PATENT DOCUMENTS

| | | |
|---|---|---|
| JP | 7-56480 | 3/1995 |
| JP | 7-311520 | 11/1995 |
| JP | 2584112 | 11/1996 |
| JP | 10-74025 | 3/1998 |
| JP | 11-219073 | 8/1999 |
| JP | 2001-66957 | 3/2001 |
| JP | 2002-72792 | 3/2002 |
| JP | 3469392 | 9/2003 |
| JP | 2005-128046 | 5/2005 |
| JP | 2005-234162 | 9/2005 |
| JP | 3716515 | 9/2005 |
| JP | 2006-78618 | 3/2006 |

OTHER PUBLICATIONS

U.S. Appl. No. 08/944,198, filed Oct. 3, 1997, Shigeru Fujita, et al.
U.S. Appl. No. 08/754,692, filed Nov. 21, 1996, Unknown.

* cited by examiner

IMAGE REMOVING DEVICE, IMAGE REMOVING METHOD, AND IMAGE FORMING/REMOVING SYSTEM

BACKGROUND OF THE INVENTION

1. Field of the Invention

The present invention relates to an image removing device for peeling off/removing an image forming substance included in an image from a recording material on which the image has been formed by an image forming apparatus such as a copier, a printer, or a facsimile machine. Furthermore, the present invention relates to an image removing method performed by the image removing device, and an image forming/removing system including the image removing device and the image forming apparatus.

More particularly, the present invention relates to an image removing device, an image removing method, and an image forming/removing system including the image removing device and an image forming apparatus, for heat-transferring an image forming substance from a recording material, on which an image including a thermoplastic image forming substance is heat-fixed, onto a peeling member, to remove the image forming substance from the recording material.

An image removing device, an image removing method, and an image forming/removing system according to an embodiment of the present invention are applicable to the technical field of removing an image formed by the most versatile electrophotographic method. Specifically, such an image is formed by forming an electrostatic latent image on a photoconductor made of a photoconducting material, developing the electrostatic latent image into a toner image with the use of a dry type toner, and transferring the toner image onto a recording material. The present invention is also applicable a technical field of removing an image formed by an electrophotographic method or with an electrophotographic device without the use of a photoconductor, but by a method of using toner including a pigment and a high polymer compound dispersed in an insulative liquid medium. Examples are a wet electrophotographic method, an electrostatic recording method, a toner jet recording method, and an ion flow recording method.

The present invention is not limited to a technical field of removing an image from a recording material on which the image is formed by an electrophotographic method; the present invention is also applicable to a recording material on which an image is formed by a magnetic recording process performed by forming an image with the use of a thermoplastic image forming substance, a heat transfer method, or an inkjet method performed by using thermofusible solid ink.

2. Description of the Related Art

In recent years and continuing, printers, analog copiers, digital copiers, and printing machines have become pervasive, and large quantities of paper have been used. Pulp is the raw material of paper sheets that are generally used as recording materials. The pulp is obtained from wood, which is a recyclable resource. However, in the manufacturing process of paper sheets, a large amount of power is consumed in the procedure of extracting cellulose fiber from wood to turn the wood into pulp, and in a papermaking procedure of drying the paper sheets. Attempts have been made to reduce the amount of carbon dioxide gas that is generated when fossil fuel is used. Specifically, fuel derived from biomass has been used in some procedures for manufacturing paper sheets. An example of fuel derived from biomass is black liquor, which is the residuum remaining after the pulp has been extracted from the wood. However, in actual circumstances, biomass-derived fuel is not used in every procedure, and a large amount of fossil fuel is still being used. Carbon dioxide gas generated from fossil fuel is considered to be the causative agent of global warming. Furthermore, depletion of fossil fuel resources needs to be decelerated. Accordingly, in view of environmental conservation, the amount of paper consumption must be reduced. Furthermore, by saving the amount of biomass-derived fuel used in paper manufacturing processes, the biomass-derived fuel can be used for purposes other than paper manufacturing processes.

In recent years and continuing, fewer forests have been recklessly logged for the purpose of manufacturing paper. However, not all paper sheets can be made only of wood obtained from forests that are sustainably managed. Therefore, it is an important social issue to mitigate consumption of paper in order to conserve forests and prevent the global environment from deteriorating.

Furthermore, paper includes inorganic components that cannot be combusted or decomposed. Therefore, every time paper is disposed, waste material that needs to be disposed by landfill is generated at a constant rate. In recent years and continuing, it has become more and more difficult to find areas for landfill to dispose paper. Thus, reduction of paper consumption is a pressing issue.

To address this problem, there is a conventional method of collecting information recording sheets that have become unnecessary, and digesting the paper into the form of pulp at a paper mill, to manufacture recycled paper. However, the problem with this method is that although it does not require new wood resources, the amount of power required in this method for transporting collected paper, digesting the paper into pulp, and manufacturing recycled paper, is the same as the amount of power used for manufacturing paper from fresh pulp. Furthermore, paper made from recycled pulp has inferior quality in terms of rigidity and whiteness, and smudges appear when characters are printed. Thus, in high-quality paper used as information recording paper, the ratio of recycled pulp needs to be no more than around 30%. In order to manufacture high-quality information recording paper having a high level of whiteness, there is a need to minimize the ratio of pulp extracted from waste paper, and to manufacture the pulp from unused waste paper. As a result, it is generally likely that the cost would exceed the cost for manufacturing paper from new wood, and the environmental load would increase. Moreover, recoding materials on which recorded information is recorded, are collected from companies and homes, which may be problematic in terms of protecting confidential information and privacy.

A method has been proposed to solve the problems accompanying the operation of collecting used paper and producing recycled paper. Specifically, images are removed from used reusable recording materials, to regenerate these recording materials. For example, patent document 1 (Japanese Laid-Open Patent Application No. H4-64472) discloses an image removing device for removing an image formed on a recording material by transferring it onto a peeling member. Specifically, an endless belt having thermofusible resin provided on its surface is used as a peeling member. An image formed on a recording material is treated with a parting agent. The image is removed from the recording material by being peeled off and transferred to the peeling member with heat. In this disclosed device, the peeling member and the recording material are superposed on each other, to which heat and pressure are applied. The endless belt which is the peeling member is rotated, so that the recording material superposed on the peeling member is conveyed to the position where a cooling roller is provided. Thus, the thermofusible resin on the peeling member and the formed image are cooled. Subsequently, the peeling member and the recording material are separated from each other.

In patent document 1, there is no description of effects achieved by such a configuration. However, according to research conducted by inventors of the present invention, by providing a thermofusible resin layer or a thermoplastic resin layer on the surface of the peeling member, images will contact the peeling member with good performance. Therefore, operations of removing images of low gray scale levels and images with unevenness (in terms of height), and removing images from a recording material with a bumpy surface can be performed with better performance compared to the case of using a peeling member without a thermofusible resin layer or a thermoplastic resin layer. Furthermore, the peeling member and the recording material are superposed on each other and heat and pressure are applied, and then the thermofusible layer on the surface of the peeling member belt is cooled before separating the peeling member and the recording material from each other. Accordingly, the cohesive force of the thermofusible resin on the surface of the peeling member is increased. Therefore, when the peeling member and the recording material are separated from each other, cohesion failure is unlikely to occur in the thermofusible layer, so that the thermofusible layer is prevented from being reverse-transferred to the recording material. If the thermofusible layer was colorless or transparent, even when the thermofusible layer is reverse-transferred to the recording material, the recording material from which the image forming substance has been removed can be reused without any inconvenience. However, after repeatedly using the peeling member, the transferred image forming substance will be mixed in the thermofusible layer. Consequently, the thermofusible layer on the surface of the peeling member will have color. If the colored thermofusible resin is reverse-transferred to the recording material, colored resin will adhere to the surface of the recording material from which the image forming substance has been removed.

In the image removing device disclosed in patent document 1, the image removing properties can be enhanced as described above. However, if the recording material had fixing properties that are high enough for having the image forming substance fixed on its surface, it would be difficult to completely remove the image forming substance from the recording material. Furthermore, if an endless belt was used as the peeling member, the belt would become displaced after repeated usage, and the displacement would be difficult to correct. If an attempt was made to forcibly correct the displacement, the peeling member may receive inconsistent tension across its width direction, which would cause the belt to deform, thereby reducing the operating life of the peeling member belt. This reference does not describe any means for removing, from the peeling member, the image forming substance that has been transferred from the recording material to the peeling member. However, it is obvious that the peeling member cannot be repeatedly used without removing the image forming substance that has been transferred from the recording material. Furthermore, if a cleaning unit was provided for removing the image forming substance from the peeling member, there would be at least two nip portions, namely a nip for transferring the image forming substance from the recording material to the peeling member, and a nip between the cleaning unit and the peeling member. With such a configuration, it has been extremely difficult to prevent the peeling member belt from being displaced.

Patent document 2 (Japanese Laid-Open Patent Application No. 2002-72792) and patent document 3 (Japanese Laid-Open Patent Application No. 2001-66957) disclose an image removing device in which the peeling member is a roller and a thermoplastic resin layer is provided on the surface of the peeling member. As described above, by providing a thermoplastic resin layer on the surface of the peeling member, the image removing properties may be improved. However, in such a configuration, the thermoplastic image forming substance that is transferred from the recording material and the thermoplastic resin layer provided on the surface of the peeling member will not maintain their respective layer forms; instead, the thermoplastic image forming substance transferred from the recording material and the thermoplastic resin layer provided on the surface of the peeling member will be combined with each other. Thus, it has been difficult to remove the image forming substance transferred to the peeling member. These patent documents describe a unit for removing the image forming substance on the peeling member by pressing a heated blade against the peeling member. However, even if a unit for heating the blade is provided, the blade will contact a part of the image forming substance that has not been fluidized on the peeling member, at least on the upstream side of the blade. Therefore, a high level of friction will be generated between the blade and the peeling member. As a result, the peeling member may be driven in an unstable (irregular) manner, or the peeling member may be hampered from being driven, or it may be necessary to provide a large motor for generating a large driving force. Moreover, if the width of the contacting part between the blade and the peeling member was reduced in an attempt to solve these problems in driving the peeling member, there would not be enough time to heat and fluidize the image forming substance on the peeling member. Thus, it has been difficult to remove the image forming substance from the peeling member. Furthermore, the processing speed has had to be extremely low in order to secure enough heating time.

In an image removing device using a roller-type peeling member (hereinafter, "roller peeling member"), a heating member such as a halogen lamp is provided inside the roller peeling member. In order to remove the image forming substance on the peeling member with a blade, the image removing device needs to be configured such that the peeling member is not cooled on the upstream side of the portion where the blade and the peeling member contact each other. This is why a heat source is provided inside the roller peeling member, as described in these references. However, if a heat source is provided inside the roller-type peeling member, the following problem may arise. Specifically, the peeling member and the recording material are superposed and heated/pressurized at a nip portion formed between the peeling member and a pressurizing member. It will be difficult to make the position of separating the recording material from the peeling member have a lower temperature than the temperature of the peeling member surface or the image forming substance at this nip portion. Thus, when separating the recording material from the peeling member, a cohesion failure is apt to occur in the image forming substance and the thermoplastic composition layer provided on the surface of the peeling member. Accordingly, it has been difficult to achieve good properties in removing the image and separating the recording material from the peeling member.

Patent document 4 (Japanese Laid-Open Patent Application No. H7-13383) discloses a method of impregnating the paper sheet on which an image has been formed by an electrophotographic method, with a liquid including water, to weaken the adhesive force between the paper sheet and the image forming substance. When the adhesive force has become weak, the paper sheet and the peeling member are heated and pressed against each other, to peel off/remove the thermoflexible image forming substance from the paper sheet. In the method disclosed in this public document, the paper fiber is caused to swell by the liquid including water, so that a shearing force is generated between the paper sheet and the image forming substance that does not swell by the liquid, thereby weakening the adhesive force between the image forming substance and the paper sheet. This is advantageous in that the image forming substance can be transferred to the peeling member even if the adhesive force between the peeling member and the image forming substance is relatively weak. The peeling member described in this public document does not have a thermoplastic composition layer provided on its surface. However, even in an image removing method performed by impregnating the paper sheet with the liquid including water to weaken the adhesive force between the paper sheet and the image forming substance before heat-transferring the image forming substance from the recording material to the peeling member, if there is no thermoplastic composition layer provided on the surface of the peeling member, the image will not sufficiently contact/adhere to the peeling member, which makes it difficult to completely remove the image from the recording material. Particularly, in the case of powder image forming substance particles, low density gradation images, or color images, the image forming substance adheres to the paper sheet in an isolated manner and forms background fogging. Therefore, the image forming substance and the peeling member do not sufficiently contact each other. Accordingly, it has been difficult to completely remove images.

Furthermore, in color images, in order to enhance the color saturation, the surface of the image forming substance is generally heat fixed until it is smoothed in a seamless manner on the surface of the recording material. For this reason, even if an image removal accelerating liquid is applied from the surface of the image, the image removal accelerating liquid will be blocked by the hydrophobic image forming substance, and therefore the image removal accelerating liquid will not reach into the depth of the paper sheet. Accordingly, it has been difficult to make the image removal accelerating liquid reach the cellulose fiber contacting the image forming substance. Thus, with the image removing method disclosed in this patent document, it has been almost impossible to remove color images.

Furthermore, in a method of applying an image removal accelerating liquid including water to the recording material, even if the amount of water applied as the image removal accelerating liquid is extremely small, the following problem may arise. That is, the paper sheet includes cellulose fiber, and therefore when a repeatedly-used recording material is processed in an image forming apparatus or an image removing device, wrinkles and curls may be formed in the recording material, or paper jamming may occur due to such curls. Therefore, the recording material cannot be repeatedly used many times. Furthermore, if a large amount of water is applied to the recording material, a large amount of power will be required for drying the absorbed water, and the size of the regenerated recording material will change.

Patent document 5 (Japanese Laid-Open Patent Application No. H11-219073) discloses a unit for removing, from a peeling member, an image forming substance that has been transferred from a recording material to the peeling member. Specifically, this patent document discloses a fixed film thickness regulating member that is spaced apart from the peeling member, as well as a film thickness regulating member that is conveyed in a direction counter to the direction in which the peeling member is conveyed. The surface of the movable film thickness regulating member disclosed in this patent document is made of a low-surface-energy material such as Teflon (registered trademark), which has no adhesive force with respect to the image forming substance. Specifically, the basic principle of the unit disclosed in this patent document is that a shearing force is applied to a thermoplastic resin layer on a peeling member and/or a thermoplastic image forming substance that has been transferred from the recording material, in order to scrape off a part of the layer/substance. However, an image forming substance used in a typical electrophotographic device is designed to have a certain level of elasticity and a high level of internal cohesion force even under the fixing temperature, so that it does not adhere to the heat fixing roller or the heat fixing belt. Thus, even if the image forming substance is heated to a temperature higher than the fixing temperature in the image forming apparatus, the cohesion force of the image forming substance will be maintained at a relatively high level. Therefore, even by pressing the image forming substance with a member that has no adhesive force with respect to the image forming substance as disclosed in this reference, it has been difficult to apply, to the image forming substance, a shearing force that exceeds the cohesive force in order to scrape off the image forming substance from the peeling member.

Patent document 6 (Japanese Laid-Open Patent Application No. H7-311520) discloses an image removing device for temporarily transferring, onto a cleaning member, an image forming substance that has been transferred from a recording material to a peeling member. The technology disclosed in patent document 6 is for transferring the image forming function on the peeling member to the cleaning member having a surface made of a material with higher adhesiveness compared to the peeling member, to entirely remove the image forming substance on the peeling member. This cleaning method is for removing the image forming substance that has been transferred from a recording material onto a peeling member without scraping off the image forming substance with a blade, to thereby mitigate attrition of the peeling member and extend the operating life of the peeling member.

In the cleaning unit disclosed in patent document 6, either one of the peeling member or the transfer cleaning member is not directly driven, but is caused to follow the rotation of the other one, so that the peeling member and the transfer cleaning member are conveyed at the same speed. In such a cleaning unit, the transfer cleaning member will need to be made of a material having a significantly higher adhesive force with respect to the image forming substance, compared to that of the peeling member. Otherwise, the image forming substance will not be transferred from the peeling member to the transfer cleaning member. Accordingly, the surface of the peeling member can only be made of a material having a relatively low adhesive force with respect to the image forming substance. In a device for applying an image removal accelerating liquid to a recording material to weaken the adhesive force between the recording material and the image forming substance, and then transferring the image forming substance from the recording material to the peeling member, the image forming substance can be transferred from the recording material even if the peeling member is made of a material having a relatively low adhesive force with respect to the image forming substance. However, in a method where a recording material having a low adhesive force with respect to the image forming substance is used, and the image forming substance is transferred and removed from the recording material to the peeling member without the use of an image removal accelerating liquid, the following condition is essential. That is, in order to make the recording material have practical fixing properties with respect to the image forming substance, the peeling member is to have high adhesiveness with respect to the image forming substance to remove the image forming substance from the recording material. For this reason, it has been difficult to apply the transfer cleaning method disclosed in this patent document to a device for transferring, peeling, and removing an image forming substance without the use of an image removal accelerating liquid.

Patent document 7 (Japanese Laid-Open Patent Application No. H7-56480) discloses a technique of directly removing an image forming substance that has been transferred from a recording material to a peeling member with the use of a flat plate-like blade. This patent document also discloses a method in which the image forming substance that has been transferred onto the peeling member is temporarily transferred onto a cleaning roller, and the image forming substance on the cleaning roller is then removed with a blade. Patent document 7 does not include any detailed descriptions regarding the transfer cleaning method; however, it describes that the transfer cleaning member has releasability with respect to the image forming substance that is lower than its releasability with respect to the peeling member. This is based on the same concept as that of the transfer cleaning unit according to patent document 6.

The following documents disclose recording materials used in an image removing device for removing an image forming substance on a recording material by a heat-transfer process, without using an image removal accelerating liquid.

Patent document 8 (Japanese Laid-Open Patent Application No. 2005-234162) discloses a reusable electrophotographic sheet manufactured as follows. Specifically, a base sheet is collated with a filler layer, which includes a polymer selected from polyvinyl alcohol, starch, carboxymethylcellulose, etc. Then, a composition is applied on this, which includes an image forming substance repellent including a compound including an alkyl group and an alkenyl group of more than or equal to carbon number 6.

Patent document 9 (Japanese Laid-Open Patent Application No. 2006-78618) discloses a reusable material having an olefin/maleic anhydride polymer provided as an image forming substance repellent at least on the side where an image is to be formed.

Patent document 1: Japanese Laid-Open Patent Application No. H4-64472
Patent document 2: Japanese Laid-Open Patent Application No. 2002-72792
Patent document 3: Japanese Laid-Open Patent Application No. 2001-66957
Patent document 4: Japanese Laid-Open Patent Application No. H7-13383
Patent document 5: Japanese Laid-Open Patent Application No. H11-219073
Patent document 6: Japanese Laid-Open Patent Application No. H7-311520
Patent document 7: Japanese Laid-Open Patent Application No. H7-56480
Patent document 8: Japanese Laid-Open Patent Application No. 2005-234162
Patent document 9: Japanese Laid-Open Patent Application No. 2006-78618

SUMMARY OF THE INVENTION

The present invention provides an image removing device, an image removing method, and an image forming/removing system in which one or more of the above-described disadvantages are eliminated.

According to an aspect of the present invention, there is provided an image removing device for removing an image forming substance having thermoplastic properties from a recording material, the image removing device including a roller peeling member onto which the recording material with the image forming substance is superposed; a heating unit configured to heat the image forming substance; a pressurizing unit configured to apply pressure to the roller peeling member and the recording material superposed thereon to cause the image forming substance heated by the heating unit to adhere to the roller peeling member; a separating unit configured to separate the recording material from the roller peeling member after the image forming substance has adhered to the roller peeling member, thereby removing the image forming substance from the recording material and transferring the image forming substance to the roller peeling member; and a removing unit configured to remove, from the roller peeling member, the image forming substance that has been transferred from the recording material to the roller peeling member, wherein the removing unit includes a transfer cleaning member whose surface is made of a material having adhesive properties with respect to the image forming substance, whereby the transfer cleaning member is not rotated by the roller peeling member, but is driven/conveyed in such a manner that the transfer cleaning member and the roller peeling member pressurize/contact/slide against each other, so that the image forming substance that has been transferred from the recording material to the roller peeling member is temporarily transferred to the transfer cleaning member before subsequently being removed from the transfer cleaning member.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to FIGS. 1 through 8, of an image removing device according to first through fourth embodiments of the present invention.

First Embodiment

First, a description is given of an image removing device according to a first embodiment of the present invention with reference to FIGS. 1 through 4.

Figure 1:
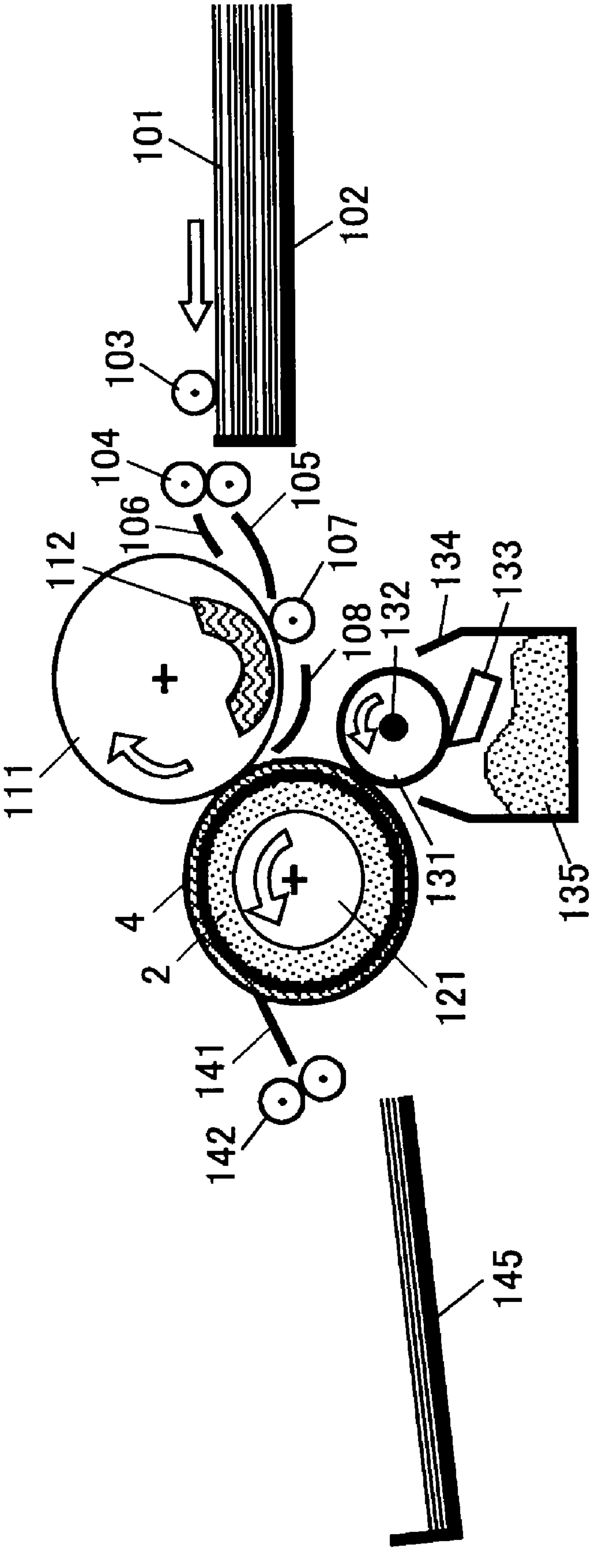
FIG. 1 is a schematic diagram of an image removing device according to a first embodiment of the present invention.

As shown in FIG. 1, in a sheet feeding cassette 102, recording materials 101 with images formed thereon are set with their sides with images facing down. The images on these recording materials 101 had been formed by, for example, an image forming apparatus employing the electrophotographic method, and are no longer necessary by the user. A preferable example of the recording material 101 is a reusable recording material coated beforehand with a composition which decreases the fixing property of fixing an image forming substance onto the recording material. The recording materials 101 from which images are to be removed are conveyed to a transfer peeling unit by a sheet feeding roller 103, a pair of sheet feeding rollers 104, a conveying roller 107, and guide plates 105, 106, and 108.

The transfer peeling unit includes a roller peeling member 121, a heating/pressurizing roller 111, an IH heating magnetic coil 112, a separating member 141, a transfer cleaning roller 131, a transfer cleaning roller heater 132, a cleaning blade 133, a collected image forming substance container 134, a pair of sheet eject rollers 142, and a sheet eject tray 145.

(Configuration of Peeling Member)

In the image removing device according to an embodiment of the present invention, a roller peeling member is used.

If the roller peeling member 121 need not be provided with a thermoplastic composition layer, the following roller can be used as the roller peeling member 121 without modification. That is, a rigid roller having a thickness of more than or equal to 0.3 mm, and which is made of a metal such as aluminium, stainless steel, iron, copper, titanium, and brass; a thermosetting resin component such as phenolic resin, urea resin, polyimide resin, and aramid; a heat-resistant resin component; ceramics; or glass; can be used. Furthermore, a rubber elastic layer can be provided on such a roller, which layer can be made of acrylic rubber, styrene-butadiene rubber, isoprene rubber, natural rubber, butyl rubber, polyurethane rubber, silicon gum, or fluororubber. However, rubber materials generally have low adhesiveness with respect to image forming substances. For this reason, when a rubber material contacts image forming substances for a long time, some of the components of the image forming substances are likely to transfer to the rubber, and may change the physical properties of the rubber. Therefore, a peeling member made by merely providing a rubber elastic layer on a base roller may not be preferable as the roller peeling member according to an embodiment of the present invention.

In order to achieve a recording material having practical fixing properties for images as well as practical writing properties, the recording material preferably has considerable irregularities on its surface. A preferable roller peeling member has a thermoplastic composition layer provided on its surface, which layer is plasticized at the temperature for the image removing process. A color image includes images of secondary and tertiary colors superposed on each other, and is therefore more uneven (in terms of height) than a monochrome image.

The thermoplastic composition layer is heated and plasticized when the image removing process is performed. Accordingly, the thermoplastic composition layer is pressed against the image forming substance on a recording material, and can be deformed according to the irregularities on the recording material as well as the unevenness of the image. Thus, the image forming substance and the peeling member can contact each other in a favorable manner. Consequently, by using a roller peeling member having a thermoplastic composition layer on its surface, favorable image removing properties can be achieved.

Thus, the roller peeling member according to an embodiment of the present invention preferably has a thermoplastic composition layer provided on its surface. More specifically, a thermoplastic composition layer is provided on the above-described roller peeling member without a thermoplastic composition layer. A preferable example of the roller peeling member used in the image removing device according to an embodiment of the present invention is an aluminum roller or a stainless steel roller provided with the thermoplastic composition layer.

Figure 5:
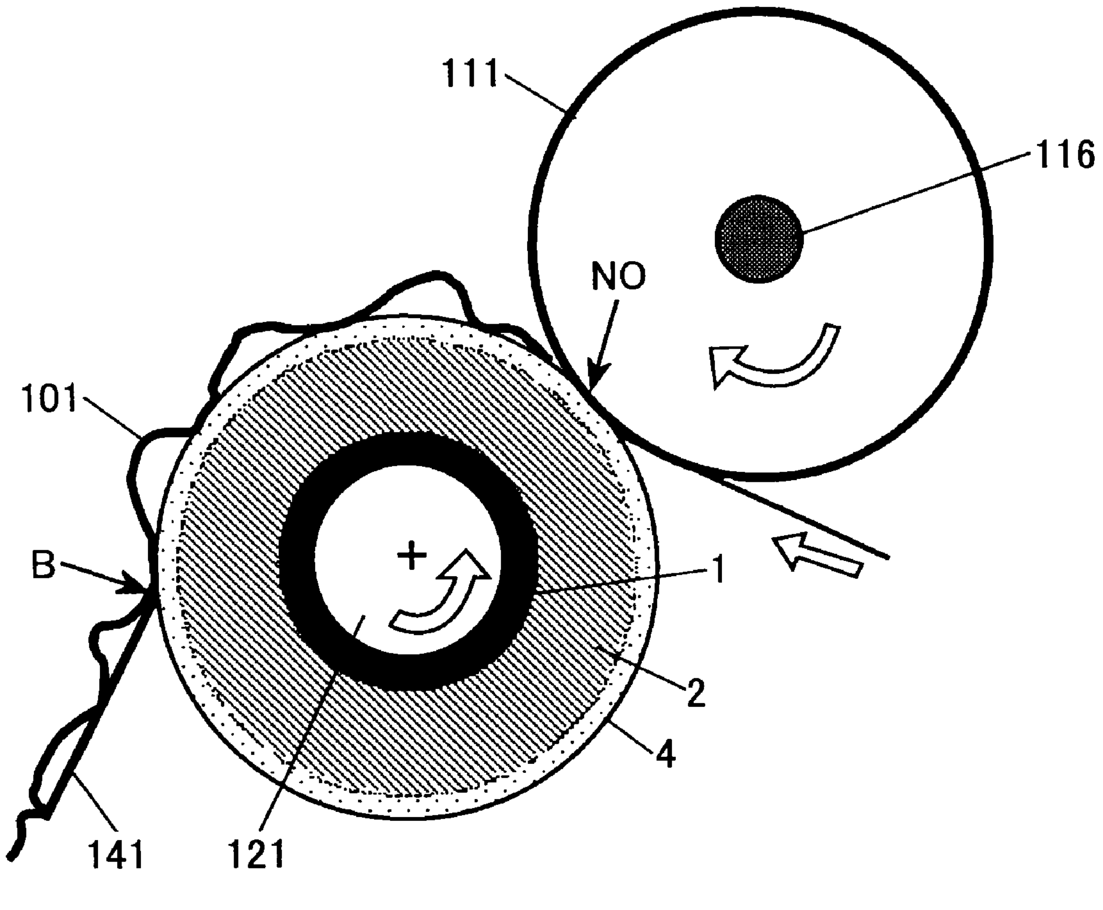
FIG. 5 is a schematic diagram illustrating how the recording material cyclically rises (separates) from the peeling member near the nip portion outlet formed by the heating/pressurizing member and the peeling member, when using a roller peeling member that has a thermoplastic composition layer directly provided on a rubber elastic layer without having an intermediate adhesive layer provided.

However, if the roller peeling member according to an embodiment of the present invention is provided with a rubber elastic layer, it is not preferable to provide the thermoplastic composition layer directly on the rubber elastic layer. This is because after repeated usage, components of the thermoplastic composition layer may be transferred to the rubber elastic layer, and may change the physical properties of the base roller and the rubber elastic layer. Furthermore, after the recording material passes through the nip portion at which the peeling member and the recording material are superposed and pressurized, the recording material would cyclically rise (separate) from the peeling member as shown in FIG. 5, near the outlet of the nip portion, and images may remain on the recording material. Therefore, when a rubber elastic layer is provided on the roller peeling member, an intermediate adhesive layer is preferably provided as shown in FIG. 2.

Figure 2:
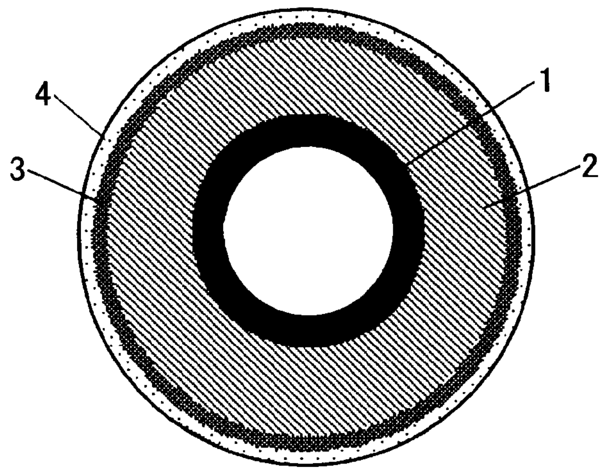
FIG. 2 is a schematic diagram of a roller peeling member used in the image removing device according to an embodiment of the present invention.

FIG. 2 is a cross-sectional view of an example of the roller peeling member (denoted by 121 in FIG. 1), and 1 denotes a peeling member base, which can be made of a metal material such as aluminium, stainless steel, iron, copper, titanium, and brass; a thermosetting resin component such as phenolic resin, urea resin, polyimide resin, and aramid; a heat-resistant resin component; ceramics; or glass. The base roller shown in FIG. 2 is hollow; however, a heat source is not provided inside, and therefore a base roller can be solid instead of hollow. The outer diameter of the entire peeling member roller is not particularly limited, but is preferably approximately 10 mm through 80 mm, so that the size of the image removing device is not too large and the image removing process can be performed in a practical manner.

In FIG. 2, 2 denotes a layer having rubber elasticity. Any of the above described rubber materials can be used for a short period of time. However, at least the surface of the peeling member is heated to approximately 70° C. through 170° C. while removing the image forming substance, and therefore the rubber configuring the rubber elastic layer is preferably heat resistant. Thus, silicon gum and fluororubber are particularly preferable among the above rubber materials. The roller peeling member shown in FIG. 2 has an intermediate adhesive layer as described below. Therefore, even if a foamed, sponge-type rubber member is used, the thermoplastic composition layer does not penetrate the foamed body, so that the roller peeling member can be used with good performance. If a rubber elastic layer is provided on the roller peeling member, as in the image removing device shown in FIG. 1, there will be no need to provide a rubber elastic layer on the member for applying heat/pressure to make the image forming substance on the recording material adhere to the peeling member. Thus, the heating/pressurizing member can be made of a metal material with high heat conductivity, so that its temperature can be controlled in narrow temperature ranges.

In the case of solid rubber that is not foamed, the rubber hardness is preferably 10° through 80°, more preferably 25° through 50°, according to the specification of JIS K6301A (Japanese Industrial Standard). In the case of foamed sponge-type rubber, the rubber hardness is preferably 10° through 90°, more preferably 20° through 60°, according to the specification of JIS S6050. If the rubber hardness is too low, the pressure will be insufficient for pressurizing the recording material superposed with the peeling member to cause the image forming substance on the recording material adhere to the peeling member. If the rubber hardness is too high, the nip portion between the recording material and the peeling member will not be wide enough. As a result, the temperature of the image forming substance will rise only slowly to the temperature by which the image forming substance can to adhere to the peeling member, thereby hampering high-speed processing.

The thickness of the rubber elastic layer can be relatively thin if the pressurizing member facing the peeling member has rubber elasticity. However, if this pressurizing member is rigid, such as a metal roller, the rubber elastic layer preferably has a thickness of more than or equal to 0.5 mm, more preferably more than or equal to 2 mm and less than or equal to 10 mm, in order to generate a sufficient adhesive force between the image forming substance on the recording material and the peeling member to remove the image.

In FIG. 2, 3 denotes an intermediate adhesive layer. The intermediate adhesive layer 3 can be made of materials such as polyether sulphone, polysulphone, polyether-imide, polyphenylene sulfide, polycarbonate, polyallylate, polyimide, and polyether ether ketone. The thickness of the intermediate adhesive layer 3 is preferably 2 μm through 120 μm, more preferably 10 μm through 90 μm.

If a thermoplastic composition layer is directly provided on a rubber elastic layer without providing an intermediate adhesive layer, the following problem may arise. That is, assuming a paper sheet having a general basis weight of 60 g/$m^2$ through 110 g/$m^2$ is used as the base of the recording material, after the recording material passes the nip portion formed between the pressurizing member and the peeling member roller, and before the recording material separates from the peeling member, the recording material locally rises (separates) from the peeling member when it is not supposed to. As a result, after the recording material is separated from the peeling member, there will be an image forming substance remaining on the part of the recording material where it had risen. FIG. 5 illustrates the recording material that has locally risen.

As shown in FIG. 5, some portions of the recording material 101 that has passed through the nip portion outlet NO are rising from the roller peeling member 121. According to research conducted by the inventors of the present invention, it was found that the recording material 101 would be prevented from rising in this manner if the intermediate adhesive layer 3 had a thickness of approximately 2 μm, assuming that the intermediate adhesive layer 3 was made of a general high polymeric organic material. This thickness depends on physical properties of the intermediate adhesive layer 3, such as the Young's modulus. If the thickness of the intermediate adhesive layer 3 exceeded 90 μm, more particularly 150 μm, the separating properties between the recording material and the peeling member would be degraded.

In FIG. 2, an outermost layer 4 of the peeling member is a thermoplastic composition layer. A thermoplastic composition includes a thermoplastic resin, and preferably has a softening temperature of less than or equal to 150° C., so that it is plasticized at the image removing process temperature. After repeatedly performing the image removing process, image forming substances that have been transferred from the recording material will be mixed with the thermoplastic composition layer on the surface of the peeling member. Thus, in the end, the thermoplastic composition will have a composition near that of the image forming substance forming the images on the recording materials. Therefore, the thermoplastic composition layer provided on the surface of the peeling member preferably has the same composition as that of the image forming substance. Alternatively, the composition of the thermoplastic composition layer can be obtained by removing or reducing, from the image forming substance component, pigments, a charge control agent, wax added as a parting agent, an external additive for providing fluidity to particles, and a surface-active agent. Accordingly, changes in the composition of the thermoplastic composition layer can be minimized even after repeated usage.

Thus, a composition used as toner that is generally used in an electrophotographic image forming apparatus can be used for the thermoplastic composition layer.

More specifically, thermoplastic resin can be used for the thermoplastic composition layer, and examples of the thermoplastic resin that can be used in the thermoplastic composition layer include styrene polymers and substituted styrene polymers including, but not limited to, polyester resin, polystyrene, poly p-chlorostyrene, and polyvinyl toluene, which are obtained by performing condensation polymerization with the use of carboxylic acids and polyhydric alcohols. The carboxylic acids include, for example, terephthalic acid, fumaric acid, maleic acid, succinic acid, glutaric acid, adipic acid, pimelic acid, suberic acid, azelaic acid, sebacic acid, brasylic acid, pyromellitic acid, citraconic acid, glutaconic acid, mesaconic acid, itaconic acid, teraconic acid, phthalic acid, isophthalic acid, hemimellitic acid, mellophanic acid, trimesic acid, prehnitic acid, and trimellitic acid. These carboxylic acids can be used alone or in combination. The polyhydric alcohols include, for example, bisphenol A, hydrogenated bisphenol A, ethylene glycol, propylene glycol, butanediol, neopentyldiol, hexamethylenediol, heptanediol, octanediol, pentaglycerol, pentaerythritol, cyclohexanediol, cyclopentanediol, pinacol, glycerin, etherified diphenol, catechol, resorcinol, pyrogallol, benzenetriol, phloroglucinol, and benzenetetraol. These polyhydric alcohols can be used alone or in combination. Other examples of the thermoplastic resin are styrene copolymers such as styrene-p-chlorostyrene copolymer, styrene-propylene copolymer, styrene-vinyl toluene copolymer, styrene-vinyl naphthaline copolymer, styrene-methyl acrylate copolymer, styrene-ethyl acrylate copolymer, styrene-butyl acrylate copolymer, styrene-octyl acrylatecopolymer, styrene-methyl methacrylate copolymer, styrene-ethyl methacrylate copolymer, styrene-butyl methacrylatecopolymer, styrene-glycidyl methacrylate copolymer, styrene-dimethylaminoethyl methacrylate copolymer, styrene-diethylaminoethyl methacrylate copolymer, styrene-diethylaminopropyl acrylate copolymer, styrene-ethyleneglycol methacrylate copolymer, styrene-acrylonitrile copolymer, styrene-vinyl methyl ketone copolymer, styrene-butadiene copolymer, styrene-isoprene copolymer, styrene-acrylonitrile-indene copolymer, styrene-maleate copolymer, and styrene-maleate ester copolymer. Other examples of the thermoplastic resin are polymethyl methacrylate, polybutyl methacrylate, polyvinyl chloride, polyvinyl acetate, polyethylene, polypropylene, polyester, epoxy resin, epoxy polyol resin, polyurethane, polyamide, polyvinyl butyral, polyacrylic acid resin, rosin, modified rosin, terpene resin, aliphatic or alicyclic hydrocarbon resin, and aromatic petroleum resin.

The thermoplastic composition layer on the surface of the peeling member preferably includes a parting agent. If the thermoplastic composition layer on the surface of the peeling member includes a parting agent, the following advantage can be achieved. That is, when the recording material from which an image is to be removed is not yet supplied to the transfer/peeling unit of the image removing device, even if the heating/pressurizing unit contacts the thermoplastic composition layer formed on the surface of the peeling member, the thermoplastic composition will be prevented from adhering to the heating/pressurizing unit. If the thermoplastic composition layer on the peeling member adheres to the heating/pressurizing unit, the thermoplastic composition on the heating/pressurizing unit will be offset to the backside of the recording material while it is undergoing the image removing process, thus soiling the backside of the recording material. Furthermore, if the thermoplastic composition is configured so as not to adhere to the heating/pressurizing unit, it will not be necessary to apply a parting agent such as silicon oil to the heating/pressurizing unit for preventing adherence of the thermoplastic composition, thereby simplifying the configuration of the image removing device. Moreover, if a parting agent is included in the thermoplastic composition layer, the recording material will easily separate from the peeling member.

It is possible to use, without modification, a typical parting agent that is added to image forming substances used in electrophotographic devices, similar to a thermoplastic resin and coloring material. As described above, if the peeling member is repeatedly used for a long period of time, the composition of the thermoplastic composition layer on the surface of the peeling member will gradually become the same as that of the image forming substances that are removed. Thus, in order to prevent the components of the thermoplastic composition layer from changing after repeated usage, a parting agent made of the same materials as the parting agent included in the image forming substance forming the image to be removed, is preferably added to the thermoplastic composition layer, by an amount corresponding to approximately 1 wt % through 10 wt % of the entire thermoplastic composition.

Specific examples of the parting agent to be added to the thermoplastic composition layer are wax having a melting point of 60° C. through 110° C., such as a high polymer compound of the fluorine system or the silicon system, an organic high polymer compound having a long-chain alkyl group on its side chain, carnauba wax, montan wax, bees wax, paraffin wax, microcrystalline wax, higher alkyl alcohols, higher fatty acids, higher fatty acid esters, and higher alkyl amide.

It is not necessarily required to add a coloring material to the thermoplastic composition layer to achieve the function of removing the image forming substance on the recording material. However, an additive can be initially included in the thermoplastic composition layer, for example, an external additive such as silica or titanium oxide, or a charge control agent, for enhancing fluidity of the coloring material included in the image forming substance and the fluidity of the image forming substance particles. This will make it difficult to read the information transferred on the peeling member. Additionally, the physical properties of the thermoplastic composition layer can be made similar to those of the image forming substance transferred from the recording material. By making the thermoplastic composition layer on the surface of the roller peeling member have a composition similar to that of the image forming substance to be transferred from the recording material, it will be possible to mitigate the change in the composition of the thermoplastic composition layer, even after repeatedly performing the image removing process.

The coloring material to be added to the thermoplastic composition layer can be any coloring material used in typical image forming substances.

For example, the following known coloring materials included in toner used for electrophotographic methods can be added: a black pigment such as carbon black and iron oxide; a yellow pigment such as C.I. pigment yellow 12, C.I. pigment yellow 13, C.I. pigment yellow 14, C.I. pigment yellow 15, C.I. pigment yellow 17, C.I. pigment yellow 93, C.I. pigment yellow 94, C.I. pigment yellow 138, C.I. pigment yellow 155, C.I. pigment yellow 156, C.I. pigment yellow 180, and C.I. pigment yellow 185; a magenta coloring material such as C.I. pigment red 2, C.I. pigment red 3, C.I. pigment red 5, C.I. pigment red 16, C.I. pigment red 48:1, C.I. pigment red 53:1, C.I. pigment red 57:1, C.I. pigment red 122, C.I. pigment red 123, C.I. pigment red 139, C.I. pigment red 144, C.I. pigment red 166, C.I. pigment red 177, C.I. pigment red 178, and C.I. pigment red 222; and a cyan coloring material such as C.I. pigment blue 15, C.I. pigment blue 15:2, C.I. pigment blue 15:3, C.I. pigment blue 16, C.I. pigment blue 60.

The thermoplastic composition layer is preferably 2 μm through 120 μm, more preferably 5 μm through 70 μm, and even more preferably 10 μm through 50 μM. If the thermoplastic composition layer is too thin, the image forming substance in the image and the image forming substance adhering to the background of the recording material will not be completely removed. It is particularly difficult to remove images having relatively large irregularities from recording materials, such as typical color electrophotographic images that are commercially used. Conversely, if the thermoplastic composition layer is too thick, when the recording material and the peeling member are superposed and pressurized to remove the image from the recording material, the recording material, particularly the leading edge of the recording material in the conveyance direction, will be apt to sink into the thermoplastic composition layer. As a result, it may be difficult to separate the recording material from the peeling member.

The thermoplastic composition layer described above is provided on the peeling member having the rubber elastic layer shown in FIG. 2. However, the same thermoplastic composition layer as described above can also be provided on a roller made of aluminium or stainless steel without providing a rubber elastic layer.

(Detailed Configuration and Operations of the Image Removing Device)

FIGS. 1 and 2 illustrate an example of the image removing device including a roller peeling member provided with a rubber elastic layer. The roller peeling member 121 is rotated in the direction indicated by the arrow in FIG. 1, by a driving system (not shown). The roller peeling member 121 preferably has an outer diameter of approximately 15 mm through 80 mm. The heating/pressurizing roller 111 is a hollow roller made of metal such as aluminum, iron, and stainless steel, which has provided on its surface a low-surface-energy material such as polytetrafluoroethylene and perfluoro alkyl vinyl ether resin, so that the thermoplastic composition on the surface of the peeling member does not adhere to the heating/pressurizing roller 111. It is also possible to use a roller peeling member that is not provided with a rubber elastic layer. However, when the roller peeling member is not provided with a rubber elastic layer, it is necessary to provide a rubber elastic layer on the heating/pressurizing roller 111 in order to form a nip. In the example illustrated in FIG. 1, the IH heating magnetic coil 112 is used as a heat source to make the heating/pressurizing roller 111 generate an eddy current to generate heat. A light source that generates infrared rays such as a halogen lamp may also be used as the heat source.

A nip is formed between the roller peeling member 121 and the heating/pressurizing roller 111, when pressure is applied by a spring, water pressure, or a pneumatic pressure device (not shown). An A4-sized recording material is to be conveyed in the width direction. Therefore, assuming that the width of the roller peeling member 121 is approximately 300 mm, pressure of approximately 20 N through 200 N is preferably applied, with a spring etc., to one side of the pressurizing member such as a roller, so that the nip width is 3 mm through 20 mm. Accordingly, the image forming substance on the recording material can be transferred to the roller peeling member 121 with good performance. The heating/pressurizing roller 111 is caused to rotate due to the friction generated by the pressure at the nip formed between the roller peeling member 121 and the heating/pressurizing roller 111, so that the heating/pressurizing roller 111 rotates at substantially the same circumferential speed as that of the roller peeling member 121. The heating/pressurizing roller 111 can have a rubber elastic layer provided between the metal base and the low-surface-energy layer.

The surface of the heating/pressurizing roller 111 is provided with a temperature sensor (not shown) such as a thermocouple thermometer, a platinum resistance thermometer, a thermister thermometer, and an infrared ray sensitive temperature sensor, for measuring the temperature of the surface of the roller. Feedback information is provided from the temperature sensor, so that a controller (not shown) controls whether to turn on/off the IH heating magnetic coil 112, thereby fixing the surface temperature of the heating/pressurizing roller 111. The appropriate temperature range controlled by the temperature controller (not shown) is preferably set so that the image forming substance on the recording material is heated to 65° C. through 130° C., assuming that the image forming substance is used in a typical electrophotographic image forming apparatus that is commercially available. Furthermore, the temperature of the surface of the heating/pressurizing roller 111 is preferably maintained at 80° C. through 180° C., more preferably 90° C. through 150° C. However, these temperature ranges depend on the physical properties of the image forming substance and the speed of the image removing process. The image forming substance on the recording material 101 and the thermoplastic composition layer on the surface of the roller peeling member 121 become soft and plastic as they are heated to 65° C. through 130° C. by the heating/pressurizing roller 111. As the image forming substance on the recording material 101 passes through the nip portion formed by the heating/pressurizing roller 111 and the roller peeling member 121, the image forming substance receives pressure from the roller peeling member 121, and adheres to the roller peeling member 121.

After the recording material 101 passes through the nip portion formed by the heating/pressurizing roller 111 and the roller peeling member 121, the recording material 101 adheres on the thermoplastic composition layer on the surface of the roller peeling member 121 until it is conveyed to the position where it is separated from the roller peeling member 121 by the separating member 141. The separating member 141 is a separating claw or a separating plate which is provided in contact with the roller peeling member 121 or spaced apart from the roller peeling member 121 with a microscopic interval of 0.05 mm through 0.3 mm. Alternatively, the roller peeling member 121 can be narrower than the recording material to be processed, and a guide member serving as the separating member can be provided on one side or both sides of the roller peeling member 121, to forcibly separate the edges of the recording material from the roller peeling member 121.

A particularly preferable separating member has the following configuration. A guide member is provided on both sides of the roller peeling member to forcibly separate the recording material from the roller peeling member. A separating claw or a separating plate is disposed slightly downstream of the position where the edges of the recording material 101 are forcibly separated from the peeling member, spaced apart from the peeling member with a microscopic interval therebetween, so as not to contact the peeling member. By using a separating unit including both a member for forcibly separating the edges of the recording material and a separating claw or a separating plate, the following advantage is achieved. That is, even if the base paper material of the recording material 101 has relatively low rigidity, and even if the recording material 101 has high fixing properties for having images fixed thereto, the recording material 101 can still be separated from the roller peeling member 121. In FIG. 1, for the purpose of simplification, the guide plate for forcibly separating both edges of the recording material are not shown; only the separating member 141 is shown, which includes a separating claw provided around the center portion in the width direction of the roller peeling member. By using paper as the base material, the recording material can be provided at low cost and small environmental load.

When pressure is applied to the heated image forming substance on the recording material superposed on the peeling member, the image forming substance on the recording material would adhere to the peeling member with better properties if the fluidness of the image forming substance and the thermoplastic composition layer were relatively high. Therefore, the temperature of the image forming substance on the peeling member and the temperature of the thermoplastic composition layer on the surface of the peeling member are preferably high enough to heat the image forming substance to the aforementioned temperature, for the purpose of enhancing fluidness. However, if the image forming substance on the recording material and the thermoplastic composition layer have high fluidness when the recording material is separated from the peeling member, cohesion failure may occur. As a result, after the separation, the image forming substance on the recording material may not be completely transferred to the peeling member, or the thermoplastic composition layer on the peeling member may be reverse-transferred to the recording material. Thus, the temperature of the image forming substance on the recording material and the temperature of the thermoplastic composition layer on the peeling member are preferably lower at the position where the recording material and the peeling member are separated, compared to the nip portion outlet where the recording material and the peeling member are superposed and heated/pressurized. Accordingly, good image removing properties and good separating properties of separating the recording material from the peeling member can be achieved.

In the example of the image forming apparatus shown in FIG. 1, there are no heat sources such as a halogen lamp inside the roller peeling member. Thus, after the recording material passes through the nip portion formed by the heating/pressurizing roller 111 and the roller peeling member 121 and by the time the recording material reaches the separating position at the downstream side of the nip portion, the image forming substance on the recording material and the thermoplastic composition layer on the roller peeling member 121 would be cooled.

Unless there is a forced cooling unit such as a fan provided between the outlet of the nip portion, which is formed by the heating/pressurizing member and the peeling member, and the separating position, the separating unit at the separating position in the apparatus example shown in FIG. 1 is preferably provided in such a manner as to satisfy the following. It is assumed that the diameter of the roller peeling member 121 is D (mm), the linear speed of the image removing process is V (mm/sec), and the rotation angle around the roller peeling member 121 is θ (rad), which corresponds to the rotation angle between the nip portion outlet formed by the pressurizing member and the peeling member, and the separation position where the peeling member and the recording material are separated from each other. The separating unit is provided in such a manner that these parameters satisfy the relationship expressed by formula (I). Such a configuration is particularly preferable in that good image removing properties and good separating properties of separating the recording material from the peeling member can be achieved.

$$D\theta/V>0.5 \quad (1)$$

Figure 3:
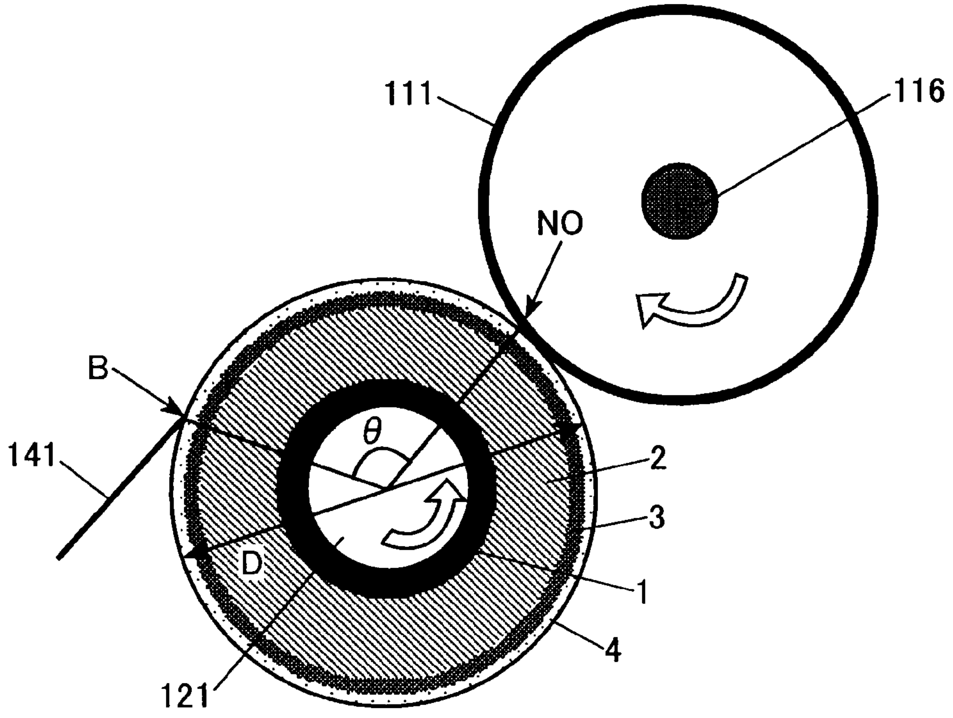
FIG. 3 is a schematic diagram illustrating the relationship between the position of a nip portion outlet formed by a heating/pressurizing member and a peeling member and the position where a recording material is separated from the roller peeling member when a roller peeling member without a heat source provided inside is used and a forced cooling unit is not used.

FIG. 3 illustrates the relationship between a nip portion outlet NO, a separation position B, a diameter D of the roller peeling member 121, and the rotation angle θ around roller peeling member 121 between the nip portion outlet formed by the pressurizing member and the peeling member and the separation position where the peeling member and the recording material separate from each other. The cooling operation not only involves the above parameters but also theoretically involves many other parameters such as the heat conductivity of the material of the peeling member, the thickness of each layer, and the temperature inside the image removing device. However, as long as the roller peeling member has a general configuration, the peeling member does not have a heat source provided inside, and the image removing device satisfies the above relationship, good image removing properties of removing an image from a recording material and good separating properties of separating the recording material from the peeling member can be achieved, without using a forced cooling unit such as a fan.

More specifically, by setting the roller diameter at approximately 30 mm through 50 mm, setting θ at 0.48 rad (45°) through 4.19 rad (240°), and setting the process speed at 28 mm/sec through 420 mm/sec, good image removing properties and good separating properties of separating the recording material from the peeling member can be achieved. For example, when a roller peeling member having a diameter of 35 mm is used and the processing speed is 70 mm/sec, the recording material is preferably separated from the peeling member at a position corresponding to a rotation angle exceeding 1 Rad (57°), more preferably 1.3 Rad (74°) from the nip portion outlet. When natural cooling is performed, and the roller diameter and the image removing process speed are of practical parameters, even if the rotation angle to the separation position is increased, the image removing properties will not be degraded by cooling the components too much. Therefore, the separation position is to be set at a rotational position corresponding to more than or equal to the value obtained by the above formula, and before the nip portion. In practical situations, it is necessary to provide a cleaning unit near the roller peeling member for removing the image forming substance that has been transferred onto the peeling member. Thus, the separation position is preferably provided at a rotational position corresponding to less than or equal to 270° from the nip portion outlet.

Figure 4:
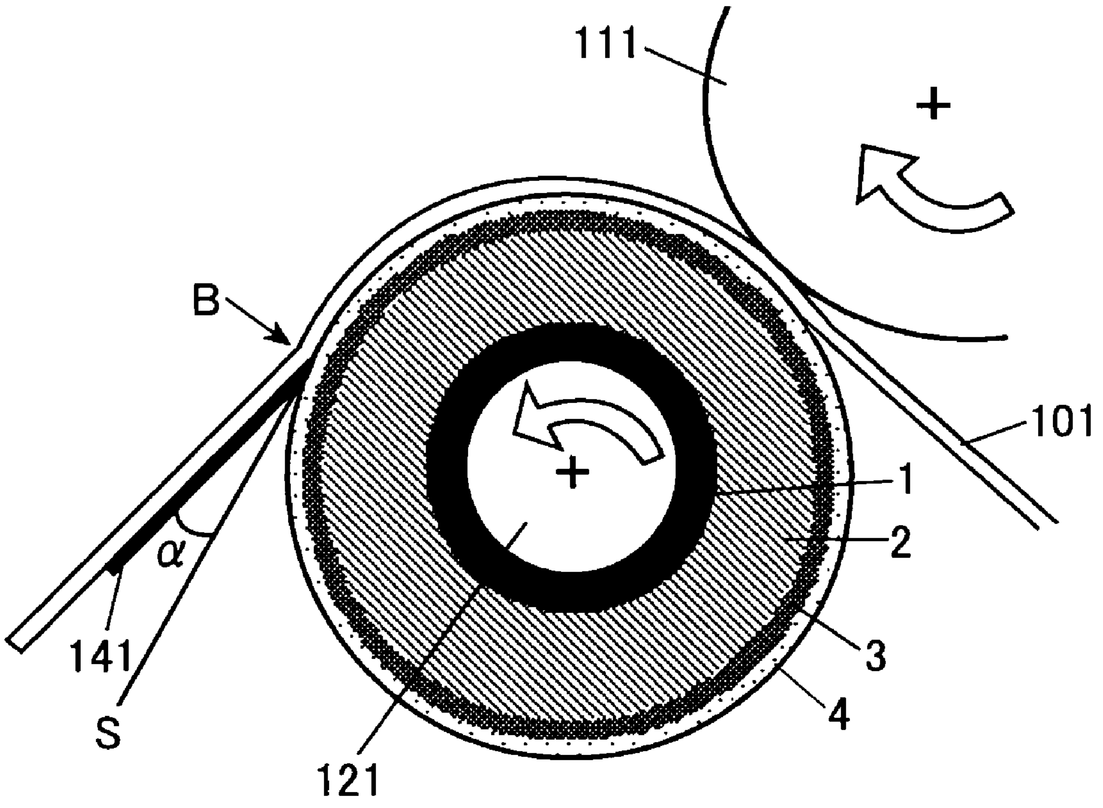
FIG. 4 is a schematic diagram illustrating a separation angle at which the recording material is separated from the roller peeling member.

FIG. 4 illustrates the separation angle. A separation angle α according to an embodiment of the present invention is defined as an angle between a tangent line S of the roller peeling member 121 and the recording material 101 immediately after the separation, at the separation position B where the recording material is separated from the roller peeling member 121. In FIG. 4, to clearly indicate the separation angle, a line is used to illustrate the separating member 141. However, if the separating member 141 is curved, the separation angle α can be approximated with an angle between a portion where the separating member 141 is most proximal and the tangent line of the peeling member. If the above-described guide member is provided on one or both sides of the roller peeling member 121 to forcibly separate the recording material, a separating member need not be provided at portions other than the edges in the width direction of the recording material 101. However, in such a configuration, the separation angle cannot be approximated with the angle between the separating member 141 and the tangent line S of the roller peeling member 121. The separation angle will be the angle between the conveyance direction of the recording material 101 immediately after it has separated from the roller peeling member 121, and the tangent line S.

Incidentally, as this separation angle increases, the image removing properties will improve. By making the separation angle more than or equal to 5°, the image removing properties will increase significantly. The principle of this feature is presumed as follows. That is, if the separation angle is large, the curvature change of the recording material will be large near the separation position B. Due to this curvature change, a shearing force will function between the image forming substance on the recording material and the recording material. Therefore, the adhesive force between the image forming substance and the recording material will decrease. Thus, the image forming substance on the recording material will be transferred to the roller peeling member 121 with good properties. According to this principle, a particularly large shearing force will function in a case where the above-described roller peeling member 121 without a heat source provided inside is used and the separation position satisfies the relationship expressed by formula (I). Specifically, at the separation position, the image forming substance on the recording material will be cooler, have a higher cohesive force, and lower fluidness, so that a large shearing force will function. However, if the temperature of the image forming substance on the recording material at the separation position is the same as the temperature of the outlet of the nip portion formed by the heating/pressurizing roller 111 and the roller peeling member 121, the image forming substance will become fluid. Therefore, even by increasing the separation angle and increasing the curvature of the recording material, a shearing force will not function between the recording material and the image forming substance, which will make it difficult to achieve good image removing properties.

According to the above principle, as the separation angle increases, the image removing properties will increase. However, if the separation angle is too large, there may be difficulties in separating the recording material from the peeling member. As a result, the recording material may not be smoothly conveyed after separation, or curls may be formed in the recording material after the image removing process. Particularly, if the separation angle exceeds 60°, there will be difficulties in separating the recording material from the peeling member, and instances of paper jamming will increase considerably. Moreover, the image removing properties will not improve any further by making the separation angle larger than 60°. Therefore, the separation angle is preferably more than or equal to 5°, more preferably in a range of 10° through 60°.

A comparison is made between the case of using an endless-belt-type peeling member and the case of using a roller peeling member. When the roller peeling member is used, during a time period extending from when the image forming substance on the recording material adheres to the roller peeling member 121 at a nip portion formed between the heating/pressurizing roller 111 and the roller peeling member 121, until the recording material 101 finishes separating from the roller peeling member 121, the curvature of the peeling member does not change at all. This is because the roller peeling member is regarded as being substantially rigid. Thus, there will be absolutely no shearing force caused by curvature change between the roller peeling member and the image forming substance on the recording material. Therefore, the adhesive force between the roller peeling member 121 and the image forming substance on the recording material will be maintained. Meanwhile, when the endless-belt-type peeling member is used, even after the image forming substance on the recording material adheres to the peeling member by receiving heat and pressure, a shearing force will function between the peeling member and the image forming substance on the recording material, due to a change in the conveyance direction of the belt and oscillation of the belt. As a result, the adhesive force between the peeling member and the image forming substance may decrease. In typical methods, particularly when separating the recording material from the peeling member, the curvature of the peeling member belt is reduced; however, in this method, a particularly strong shearing force will function between the peeling member and the image forming substance on the recording material, thereby considerably degrading the image removing properties.

The separated recording material is conveyed to the sheet eject tray 145 by the pair of sheet eject rollers 142.

As shown in FIG. 1, a transfer cleaning member is provided for removing the image forming substance that has been transferred from the recording material to the roller peeling member. The transfer cleaning roller 131 can be made of a heat-resistant high polymer compound such as polyether ether ketone and polyimide, or a metal material such as stainless steel and aluminum. The adhesive force of the surface material of the transfer cleaning roller 131 with respect to the image forming substance is not necessarily required to be stronger than that of the material of the surface of the roller peeling member without the thermoplastic composition layer. The transfer cleaning member contacts/brushes the surface of the roller peeling member. Therefore, even if the adhesive force of its surface material is weaker than that of the roller peeling member without the thermoplastic composition layer, the image forming substance on the roller peeling member can be transferred to the transfer cleaning member, particularly if the surface of the transfer cleaning member is driven at a higher speed than the circumferential speed of the roller peeling member.

The transfer cleaning member is preferably a roller as shown in the example of FIG. 1, as a high driving force can be applied to the roller shaft and positional adjustments with respect to the peeling member can be easily made. However, the transfer cleaning member can also be an endless belt. Inside the transfer cleaning roller 131, there is provided the transfer cleaning roller heater 132. The surface temperature of the transfer cleaning roller 131 is controlled so that a constant temperature is maintained, by a temperature detecting unit (not shown) and a control unit (not shown) of the transfer cleaning roller heater 132.

The transfer cleaning roller 131 is driven, by a driving unit (not shown), such that its surface rotates in a different direction or at a different speed from that of the roller peeling member 121, and is made to contact/slide against the roller peeling member 121. According to research carried out by the inventors of the present invention, it has been found that the image forming substance that has been transferred onto the roller peeling member 121 can be removed with good properties by driving the transfer cleaning roller 131 at a higher surface conveying speed than the circumferential speed of the roller peeling member 121, whether the transfer cleaning roller 131 is driven in a forward direction or a counter direction with respect to the direction in which the surface of the roller peeling member 121 is driven. More specifically, by driving the transfer cleaning roller 131 so that its surface conveying speed (circumferential speed) is 1.5 times through 10 times that of the roller peeling member 121, the image forming substance that has been transferred to the roller peeling member 121 can be transferred to the transfer cleaning roller 131. FIG. 1 illustrates an example in which the surface of the transfer cleaning roller 131 is driven in a direction counter to that of the roller peeling member 121.

A nip is formed between the transfer cleaning roller 131 and the roller peeling member 121, as pressure is applied by a spring, water pressure, or a pneumatic pressure device (not shown). However, this pressure is weaker than that between the heating/pressurizing roller 111 and the roller peeling member 121, so that the nip width is also narrower.

As described above, the thickness of the thermoplastic composition layer is preferably 2 μm through 120 μm, more preferably 5 μm through 70 μm, and even more preferably 10 μm through 50 μm. It is extremely important that the thermoplastic composition layer has a constant thickness, in order to achieve stable separating properties of separating the recording material from the peeling member and good removing properties of removing an image from a recording material. The image forming substance that has been transferred from the recording material to the peeling member will become compatible with the thermoplastic composition layer on the surface of the peeling member. Therefore, in order to remove the transferred image forming substance but still leave a certain thickness of the layer, a cohesion failure needs to be caused in the composition formed as a result of the integration of the image forming substance on the recording material and the thermoplastic composition layer on the peeling member. When separating the recording material 101 from the roller peeling member 121, the temperature needs to be such that a cohesion failure is prevented, to achieve good image removing properties. However, for the process of removing the image forming substance that has been transferred from the recording material to the peeling member, i.e., for the cleaning process, a cohesion failure needs to be caused. Accordingly, the temperature of the image forming substance on the peeling member needs to be higher at the cleaning position than that at the separating position. For a typical image forming substance used in the electrophotographic method, the surface temperature of the transfer cleaning roller is preferably approximately 10° C. through 40° C. higher than the set temperature of the surface of the heating/pressurizing roller.

The surface conveying speed of the transfer cleaning roller 131 is higher than the circumferential speed of the roller peeling member 121. Thus, unlike a case where one roller follows the rotation of the other roller so that the two rollers rotate at the same speed, in this case, a large surface area of the heated transfer cleaning roller 131 will contact a certain area of the roller peeling member 121. For this reason, the heat of the transfer cleaning roller 131 will be easily transferred to the roller peeling member 121. Accordingly, by using this transfer cleaning member, the cleaning process can be performed at high speed.

In the present invention, in order to achieve good image removing properties, the temperature of the thermoplastic composition layer on the surface of the peeling member is relatively low at the separation position. With this configuration, the image forming substance on the roller peeling member 121 cannot be removed at all by pressing a blade, which is not provided with a heating unit, against the roller peeling member 121 to remove the image forming substance that has been transferred to the roller peeling member 121. Even if a blade with a heating unit is used, the heat will not be easily transferred from the base to the surface of the peeling member, and therefore it is extremely difficult to perform processes at high speed. Furthermore, irregularities may remain on the thermoplastic composition layer if the blade contacts the peeling member in an uneven manner.

In an embodiment of the present invention, a roller peeling member is used, and therefore the shafts of both the roller peeling member 121 and the transfer cleaning roller 131 can be directly driven, so that it is easy to make them slide against each other. Meanwhile, if an endless belt-type peeling member is used, in general, the belt will be driven by a force caused by friction between a pressurized recording material and a heating/pressurizing roller. When a cleaning unit configured with a transfer cleaning member is used, the recording material may slip along the peeling member belt, so that the recording material is conveyed in an unstable manner. Particularly, if a composition for decreasing the fixing properties with respect to the image forming substance is applied, or a highly smooth recording material is used, the friction coefficient between the recording material and the heating/pressurizing roller may decrease. This problem may be difficult to prevent.

An image forming substance 135 that has been transferred to the transfer cleaning roller 131 is scraped off from the transfer cleaning roller 131 by the cleaning blade 133, and is collected in the collected image forming substance container 134. The cleaning blade can be made of metal such as stainless steel and aluminium, a heat-resistant rubber material such as silicon gum and fluororubber, and a heat-resistant organic high polymer compound such as polyether ether ketone and phenol resin. The image forming substance on the transfer cleaning roller 131 does not need to be completely removed with the cleaning blade 133. Even if some of the image forming substance is remaining, the operations of transferring the image forming substance on the peeling member to the transfer cleaning roller and smoothening the thermoplastic composition layer on the surface of the peeling member can be performed with good performance. Furthermore, the surface of the transfer cleaning roller is set to have a relatively high temperature, and the transfer cleaning roller is rotated at a relatively high speed. Thus, the image forming substance that has been transferred on the surface of the transfer cleaning roller can be removed relatively easily with a cleaning blade.

Second Embodiment

Figure 6:
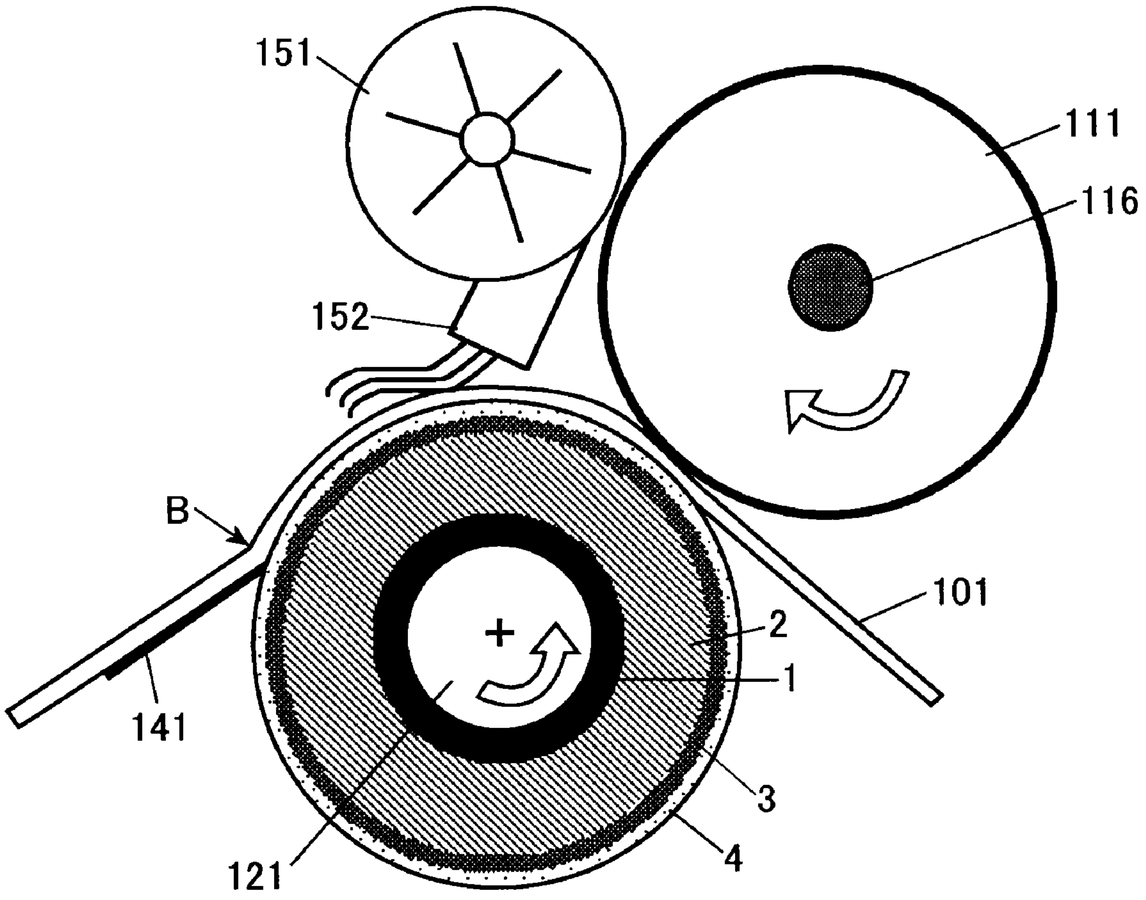
FIG. 6 is a schematic diagram of an image removing device provided with a forced cooling unit according to a second embodiment of the present invention.

Next, a description is given of an image removing device according to a second embodiment of the present invention with reference to FIG. 6. In FIG. 6, elements corresponding to or equivalent to those of the first embodiment are denoted by the same reference numbers, and are not further described.

In the image removing device shown in FIG. 6, a fan unit for blowing air onto the backside of the recording material 101 superposed on the peeling member is provided as a unit for forcibly cooling the image forming substance on the recording material and the thermoplastic composition layer on the roller peeling member 121. The fan unit is provided in a section extending between the nip portion outlet formed by the heating/pressurizing roller 111 and the roller peeling member 121 for making the image forming substance on the recording material adhere to the peeling member, and the unit for separating the recording material 101 from the roller peeling member 121. FIG. 6 only illustrates portions around the roller peeling member 121 and the heating/pressurizing roller 111. The fan unit includes a fan nozzle 152 and an air-blowing fan 151. A control unit (not shown) controls the fan unit so that the fan starts operating at a timing when the recording material exits the nip portion outlet and cool air is sent out from the fan nozzle 152 toward the backside of the recording material, until it reaches the separating unit. The air is preferably blown in a direction toward the separation position, so as not to cool the heating/pressurizing roller near the nip portion. By providing such a fan unit, the image forming substance on the recording material and the thermoplastic composition layer on the peeling member can be cooled faster. Therefore, the diameter size of the peeling member roller can be reduced, the image removing device can be made compact, and the image removing process can be performed at high speed.

Third Embodiment

Figure 7:
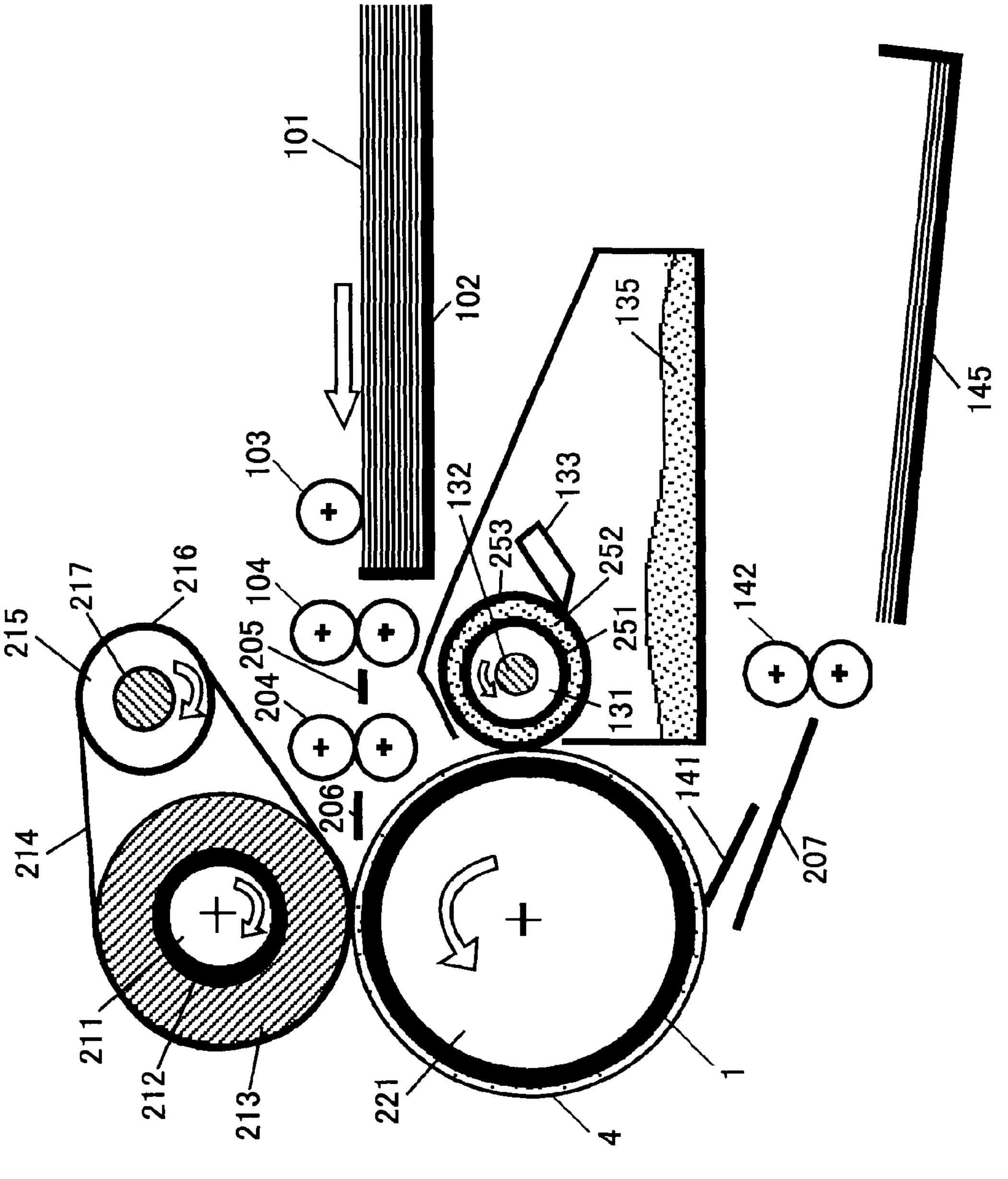
FIG. 7 is a schematic diagram of an image removing device which uses a roller peeling member having a thermoplastic composition layer provided on a rigid base according to a third embodiment of the present invention.

Next, a description is given of an image removing device according to a third embodiment of the present invention with reference to FIG. 7. In FIG. 7, elements corresponding to or equivalent to those of the first embodiment are denoted by the same reference numbers, and are not further described.

In the image removing device shown in FIG. 7, a roller peeling member 221 is not provided with a rubber elastic layer. The roller peeling member 221 is formed by directly providing the thermoplastic composition layer (outermost layer) 4 on the peeling member base 1 made of, for example, a metal material such as aluminium, stainless steel, copper, nickel, and iron; polyimide; a heat-resistant high polymer compound such as phenolic resin and polyether ether ketone; ceramics; and glass.

In FIG. 7, 214 denotes a heating/pressurizing endless belt, which includes a base made of a flexible material such as polyimide and polyether ether ketone, and the surface (outer surface) is provided with a low-surface-energy material such as polytetrafluoroethylene, polyalkylacrylicester fluoride, and perfluoro alkyl vinyl ether resin, so that the thermoplastic composition layer of the peeling member does not transfer to the heating/pressurizing endless belt 214. The heating/pressurizing endless belt 214 can be provided with a rubber elastic layer having a thickness of approximately 5 μm through 150 μm between the base and the low-surface-energy composition layer.

The heating/pressurizing endless belt 214 is stretched around a pressurizing roller 211 and a heating roller 215. The pressurizing roller 211 includes a base 212 made of a metal material such as aluminium, stainless steel, and iron; a heat-resistant high polymer compound such as polyimide, phenolic resin, and polyether ether ketone; ceramics; and glass; which base 212 is provided with a rubber elastic layer 213. This rubber elastic layer 213 can be made of a material which can also be used for the rubber elastic layer of the roller peeling member 121 of the first embodiment, but is preferably made of silicon gum in consideration of heat resistance and availability.

The heating roller 215 includes a base 216 made of a pipe-type metal material such as aluminium, stainless steel, copper, nickel, and iron. Inside the heating roller 215 is provided a heat source 217 such as a halogen lamp. To measure the temperature of the heating/pressurizing endless belt 214 in contact with the peripheral surface of the pressurizing roller 211, a temperature detecting unit (not shown) is provided. The surface temperature information of the heating/pressurizing endless belt 214 is input to a control unit (not shown). The control unit turns on/off the heat source 217, and controls output values, so that the surface of the heating/pressurizing endless belt 214 is controlled to have a constant temperature. In FIG. 7, the heat source is disposed inside the heating roller; however, the heating can be performed by an IH method, in which the endless belt is provided with a layer made of iron, silver, copper, etc., which can be induction-heated, and a magnetic coil is externally provided for making this layer generate an eddy current.

The temperature is to be controlled by the temperature controller, so as to be in the same temperature range as that of the image removing device according to the first embodiment. More specifically, the temperature is set so that the image forming substance on the recording material is heated to 80° C. through 130° C. The surface of the heating/pressurizing endless belt 214 is preferably maintained at 80° C. through 180° C., more preferably 90° C. through 150° C. The roller peeling member 221 is rotated in a direction indicated by the arrow in FIG. 7 by a driving system (not shown). Also in the image removing device according to the third embodiment, the roller peeling member 221 preferably has an outer diameter of approximately 15 mm through 80 mm.

A nip is formed between the roller peeling member 221 and the heating/pressurizing roller 211, when pressure is applied by a spring, water pressure, or a pneumatic pressure device (not shown). The heating/pressurizing endless belt 214 is sandwiched at the nip formed by the roller peeling member 221 and the pressurizing roller 211, and therefore its peripheral surface is conveyed at the same circumferential speed as that of the roller peeling member 221, by pressure and friction.

The image forming substance on the recording material 101 and the thermoplastic composition layer on the roller peeling member 221 are heated to a temperature of 80° C. through 130° C. by the heating/pressurizing endless belt 214. Then, when they become soft and fluid, pressure is applied so that the image forming substance on the recording material 101 adheres to the roller peeling member 221.

The image forming substance and the thermoplastic composition layer on the recording material become high-temperature and highly fluid in the nip formed by the pressurizing roller 211 and the roller peeling member 221, but are cooled by the time they reach the position where the recording material is separated from the peeling member, and cohesive force is increased, so that the image forming substance on the recording layer can be completely removed.

Furthermore, 204 denotes a pair of recording material conveying rollers, and 205, 206, and 207 denote guide plates.

The image removing device according to the third embodiment shown in FIG. 7 includes other elements that are different from those of the first embodiment. That is, a rubber elastic layer 252 and an image forming substance adhering layer 253 are provided on the transfer cleaning roller 131. The transfer cleaning roller 131 and the roller peeling member 221 slide against each other as they rotate. When the circumferential speed of the transfer cleaning roller 131 is higher than that of the roller peeling member 221, there need not always be a large nip width between these two rollers. However, if the roller peeling member 221 is rigid as in the present embodiment, a rubber elastic layer may be provided on the transfer cleaning roller 131 to achieve a certain nip width. Accordingly, the image forming substance can be removed from the roller peeling member 221 with good properties.

The rubber elastic layer 252 of the transfer cleaning roller 131 is preferably made of a rubber material having high heat resistance such as silicon gum and fluororubber, similar to the roller peeling member. The rubber elastic layer 252 preferably has a thickness of approximately 0.3 mm through 2 mm on a cored bar 251, to remove the image forming substance from the roller peeling member 221 with good properties.

Furthermore, the surface of the transfer cleaning roller is preferably provided with the image forming substance adhering layer 253 made of a material that has good adhesive properties with respect to the image forming substance, and that can prevent a part of the composition of the image forming substance from impregnating the rubber elastic layer. Accordingly, the physical properties of the rubber elastic layer provided on the transfer cleaning roller can be maintained at a constant level, so that even after repeatedly performing the image removing process, the image forming substance that has been transferred onto the roller peeling member 221 from the recording material can be removed with good properties. The image forming substance adhering layer 253 is preferably made of a heat-resistant high polymer material such as polyimide, polyether ether ketone, polyphenylene sulfide, and polycarbonate.

Fourth Embodiment

Figure 8:
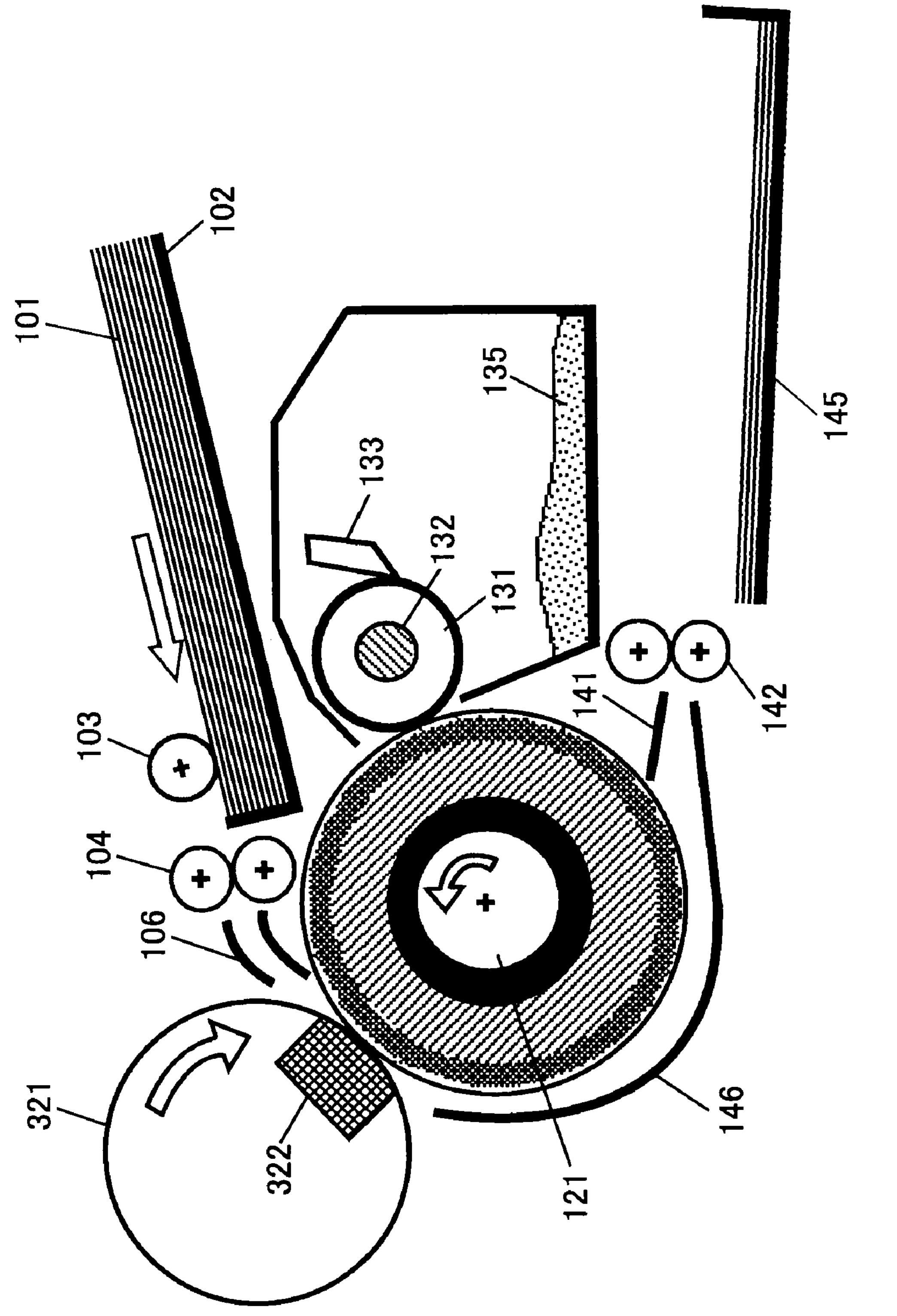
FIG. 8 is a schematic diagram of an image removing device having a heat source provided only inside a transfer cleaning roller according to a fourth embodiment of the present invention.

Next, a description is given of an image removing device according to a fourth embodiment of the present invention with reference to FIG. 8. In FIG. 8, elements corresponding to or equivalent to those of the above embodiments are denoted by the same reference numbers, and are not further described.

In the image removing device according to the fourth embodiment of the present invention shown in FIG. 8, the heater for heating the transfer cleaning roller is also used to heat the image forming substance on the recording material. In this image removing device, the roller peeling member includes the rubber elastic layer 2 and the intermediate adhesive layer 3 described above in the first embodiment. The pressure for making the image forming substance on the recording material adhere to the peeling member is applied by a unit (not shown) for applying pressure between a pressurizing block 322 and the roller peeling member 121.

In FIG. 8, 321 denotes a pressurizing free endless belt, which includes a base having a thickness of approximately 50 μm through 300 μm, and which is made of a heat-resistant high polymer material such as polyimide and polyether ether ketone. A low-surface-energy material is provided on at least the outer surface of the base to prevent the thermoplastic composition layer on the peeling member from being transferred to the pressurizing free endless belt 321. Examples of this material are polytetrafluoroethylene, polyalkylacrylicester fluoride, and perfluoro alkyl vinyl ether resin.

The roller peeling member 121 is rotated by a driving unit (not shown). As for the pressurizing free endless belt 321, pressure is applied between the pressurizing block 322 and the roller peeling member 121, which causes large friction between the pressurizing free endless belt 321 and the roller peeling member 121. Therefore, the pressurizing free endless belt 321 slides against the pressurizing block 322 and moves at substantially the same circumferential speed as the roller peeling member 121. The recording material 101 from which the image forming substance is to be removed is inserted in between the pressurizing free endless belt 321 and the roller peeling member 121.

For a typical image forming substance used in the electrophotographic method, the surface temperature of the transfer cleaning roller 131 is preferably approximately 10° C. through 40° C. higher than the temperature for making the image forming substance on the recording material adhere to the peeling member. Accordingly, the temperature of the surface of the thermoplastic composition layer provided on the surface of the peeling member is high at the position immediately after the cleaning position, and the heat quantity of the thermoplastic composition layer may be high enough to heat the image forming substance on the recording material. The image removing device according to the present embodiment is configured such that the heat capacity is smaller than a case of using a metal pressurizing roller. Specifically, the pressurizing free endless belt 321 and the pressurizing block 322 are used, so that the image forming substance can adhere to the roller peeling member 121 with good properties, even if only the heat quantity remaining on the thermoplastic composition layer provided on the surface of the roller peeling member 121 is used to heat the image forming substance on the recording material. By using the same heat source for heating the transfer cleaning member and for making the image forming substance on the recording material adhere to the peeling member, the image removing device can have a simple structure and consume less power.

[Comparative Example of Image Removing Device]

Figure 9:
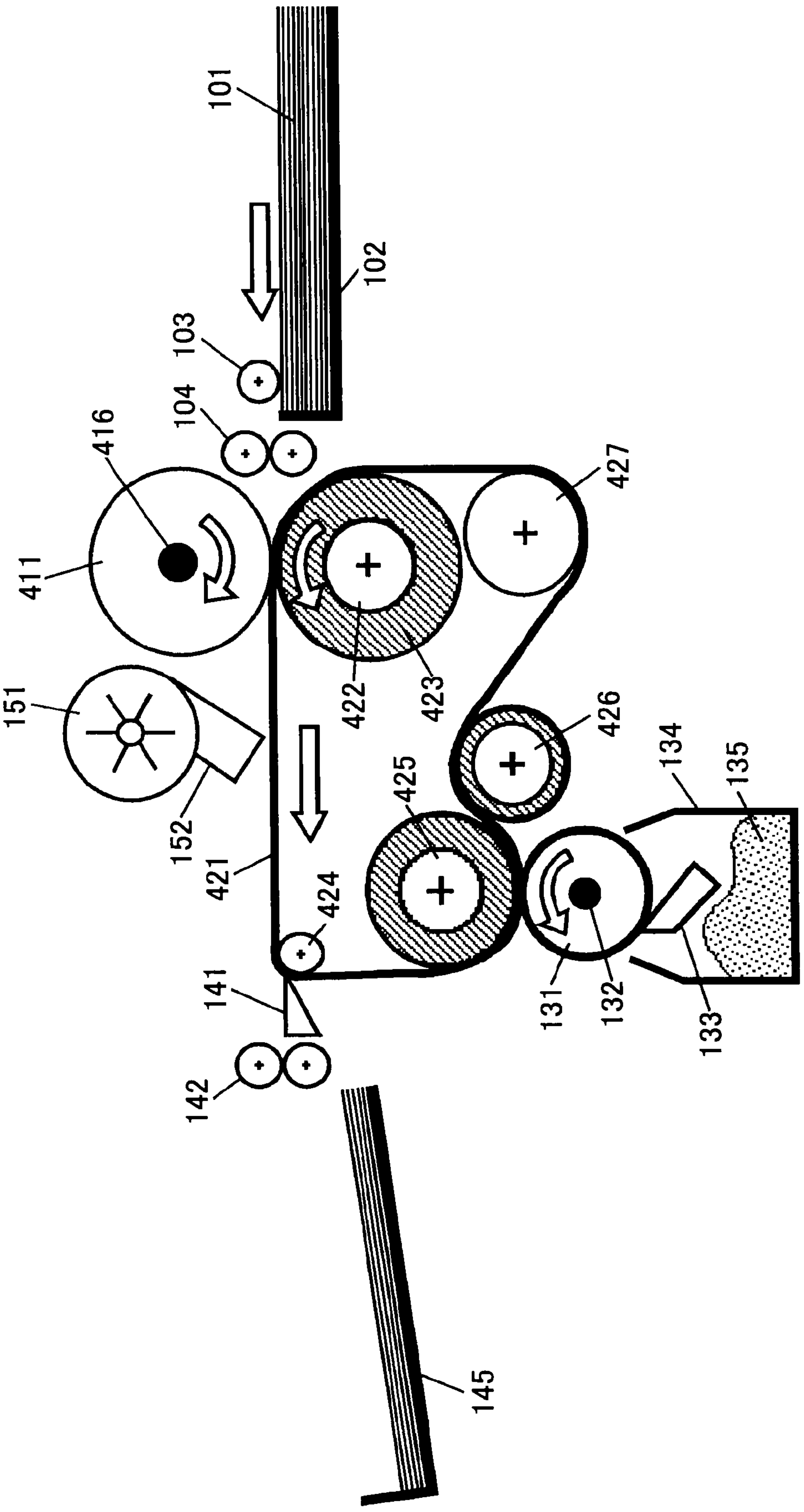
FIG. 9 is a schematic diagram illustrating a comparative example of an image removing device including an endless-belt-type peeling member, for comparison with the image removing device including the roller peeling member according to an embodiment of the present invention.

FIG. 9 illustrates a comparative example of an image removing device including an endless-belt-type peeling member, for comparison with the image removing device including the roller peeling member according to an embodiment of the present invention. In FIG. 9, elements corresponding to or equivalent to those of the above embodiments are denoted by the same reference numbers, and are not further described.

An endless-belt-type peeling member 421 is an endless belt at least including a flexible base having a thickness of 75 μm through 300 μm and made of polyimide, polyether ether ketone, polyether sulphone, polyester, polycarbonate, etc., and a thermoplastic composition layer having a thickness of 15 μm through 120 μm provided on the base. A heating roller 411 is a roller made of a metal material such as aluminum, stainless steel, and iron. Inside the heating roller 411 is provided a heat source 416 such as a halogen lamp. A pressurizing roller 422 has a heat-resistant rubber elastic layer 423 made of silicon gum, fluororubber, etc. The endless-belt-type peeling member 421 is stretched in such a manner as to have the pressurizing roller 422, a separation roller 424, a cleaning backup roller 425, and a following roller 427 in contact with the inside of the belt, and to have the heating roller 411 and a tension roller 426 in contact with the outside of the belt. In between the heating roller 411 and the pressurizing roller 422, pressure is applied by a pressurizing unit (not shown) so that the image forming substance on a recording material conveyed to this position adheres to the peeling member with good properties. Furthermore, the heating roller 411 for heating the image forming substance on the recording material conveyed to this position is controlled to have a predetermined temperature by a temperature detecting unit and a control unit which are not shown, so that the image forming substance on the recording material adheres to the peeling member with good properties.

The air-blowing fan 151 having the fan nozzle 152 is provided at a position to which the image forming substance on the recording material in contact to the endless-belt-type peeling member 421 is conveyed. The air-blowing fan 151 cools the image forming substance on the recording material and the thermoplastic composition layer formed on the endless-belt-type peeling member 421, which have been heated in the nip formed by the heating roller 411 and the pressurizing roller 422. The air-blowing fan 151 is provided with a unit with which the airflow rate can be adjusted, which makes it possible to adjust the temperature of image forming substance and the thermoplastic composition layer when they are separated.

The separation roller 424 is a roller having a small diameter of approximately 10 mm. The recording material adhering to the endless-belt-type peeling member 421 is separated from the peeling member as the endless-belt-type peeling member 421 bends at the separation roller 424 and the separating member 141 functions at this position. The separated recording material is then conveyed to the sheet eject tray 145.

This image removing device using such an endless-belt-type peeling member has the following problem, and details of which are described below. Even if the airflow rate from the fan is increased to cool the image forming substance on the recording material and the thermoplastic composition layer on the peeling member to substantially room temperature before these are separated at the separation position, the removing properties of the image forming substance on the recording material are not good. When a reusable recording material having practical fixing properties with respect to the image forming substance was used, the image forming substance was not completely removed from the recording material.

This is because when the endless-belt-type peeling member is used as above, the following problem arises. That is, the curvature of the peeling member changes from when the recording material and the peeling member are superposed with each other and the image forming substance on the recording material adheres to the peeling member, until the recording material and the peeling member are separated from each other. Accordingly, a shearing force functions between the peeling member and the image forming substance on the recording material. As a result, the adhesive force between the peeling member and the image forming substance becomes weak, at least locally. This is presumed to be the reason why the image forming substance cannot be completely removed from the recording material.

Figure 10:
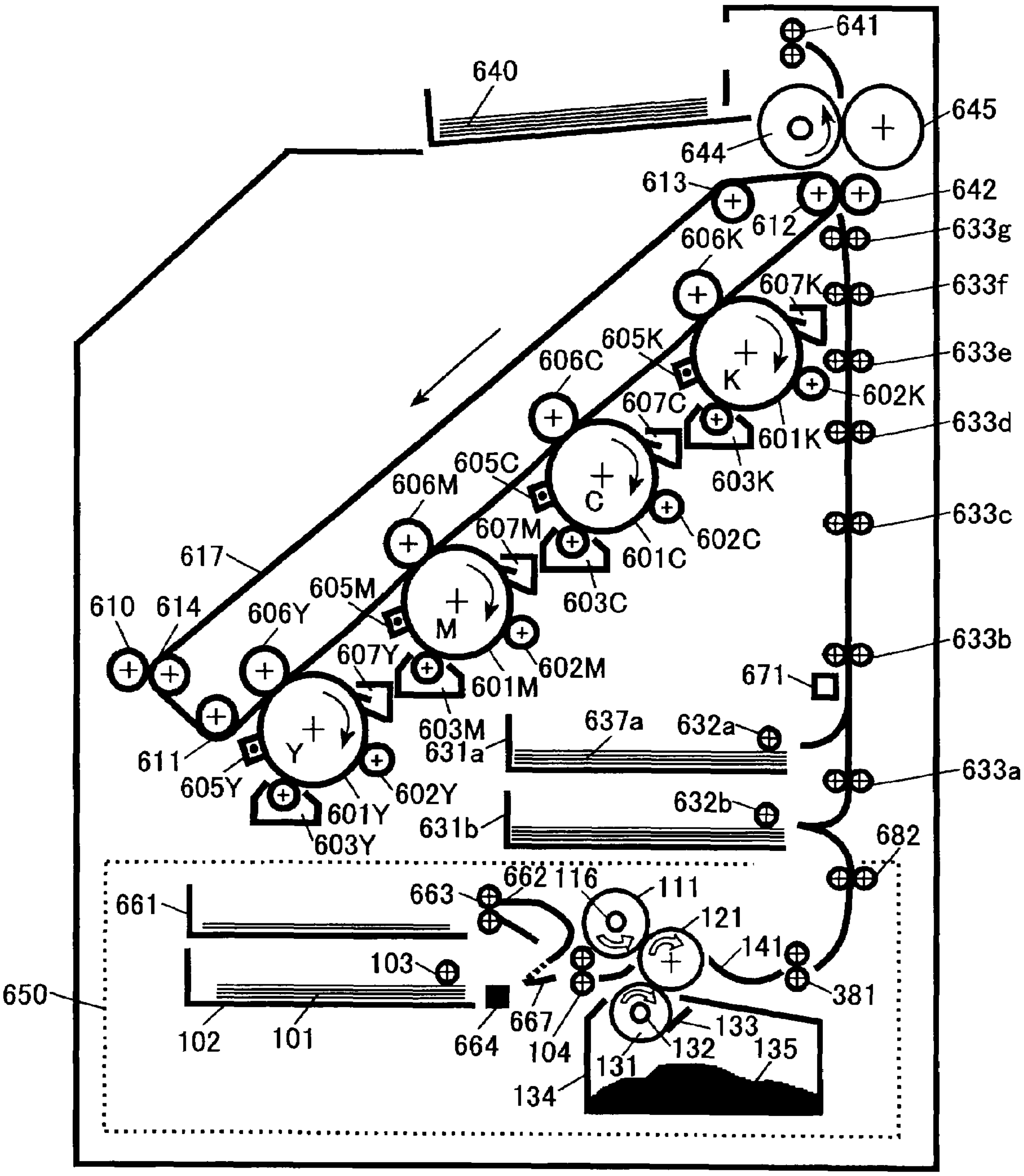
FIG. 10 is a schematic diagram illustrating an image forming/removing system according to an embodiment of the present invention.

Next, a description is given of an image forming/removing system including an image forming apparatus and an image removing device, with reference to FIG. 10.

[Example of Image Forming/Removing System]

FIG. 10 illustrates an example of an image forming/removing system in which an image forming apparatus for forming images by the electrophotographic method and an image removing device are accommodated in a single casing. In the electrophotographic image forming apparatus shown in FIG. 10, images of yellow (Y), magenta (M), cyan (C), and black (K) are formed on separate photoconductors. An image formed in each station is transferred to an intermediate transfer body 617. The image transferred to the intermediate transfer body 617 is transferred to a recording material 637 conveyed from a recording material containing unit 631. A powder image formed on the recording material 637 is heat-fixed by a fixing roller 644. Such a color electrophotographic image forming apparatus is publicly known as a tandem type color electrophotographic apparatus.

Each of the image forming stations corresponding to yellow (Y), magenta (M), cyan (C), and black (K) includes elements of a known electrophotographic apparatus as described below. Specifically, there is included a drum-type or belt-type photoconductor 601 (601Y, 601M, 601C, 601K) including a base made of metal with a photoconductor layer and a protection layer provided on its surface. There is also included a charging unit 602 (602Y, 602M, 602C, 602K) for uniformly charging the photoconductor 601 including a charging roller and a wire electrifier. There is also included a developing unit 603 (603Y, 603M, 603C, 603K) including a light radiating unit (not shown) for exposing the uniformly-charged photoconductor 601 with light in accordance with an image to be formed, and a magnetic roller or a toner conveying roller provided inside the developing unit 603 for developing, into a visible image, an electrostatic latent image that has been formed by radiating light in accordance with the image, with the use of powder toner. Examples of the light radiating unit are a laser, LED, a luminant-liquid-crystal light valve, and an optical system of a conventional analog copier for illuminating an original placed on an exposure glass and projecting the light reflected from the original onto the photoconductor. There is also included a corona charging unit 605 (605Y, 605M, 605C, 605K) for controlling the operation of charging the powder image formed on the photoconductor 601. There is also included an electric field applying unit 606 (606Y, 606M, 606C, 606K) such as a conductive roller and a corona charger for transferring the powder image formed on the photoconductor 601 to the intermediate transfer body 617. There is also included a cleaning unit 607 (607Y, 607M, 607C, 607K) for removing the powder toner remaining on the photoconductor after the transfer operation.

The light radiating unit is preferably a so-called digital light radiating unit, so that information for identifying that the printing has been performed in the first mode described below can be formed at the same time as the image requested by the user.

In addition to these elements, appropriate known elements can be provided according to need. For example, a discharging unit such as an alternating charger and a light radiating unit can be provided for removing charges on the photoconductor 601 after the image has been transferred. Also, a controlling unit can be provided for controlling the voltage to be applied to the unit for detecting the charging voltage applied to the photoconductor, and to the charger, so that even if the system deteriorates due to repeated usage and environmental changes, the potential on the charged surface of the photoconductor will be maintained at a constant level. Furthermore, if the toner need not be removed from the photoconductor after the image transfer operation, the cleaning unit 607 (607Y, 607M, 607C, 607K) can be eliminated. If the powder image formed on the photoconductor need not be charged, the corona charging unit 605 (605Y, 605M, 605C, 605K) can be eliminated.

The intermediate transfer body (belt) 617 is provided in such a manner as to have rollers 611, 612, 613, and 614 in contact with the inside of the intermediate transfer body 617. An appropriate level of tension is provided to the intermediate transfer body (belt) 617 by a tension application mechanism (not shown). The intermediate transfer body (belt) 617 is provided with a powder removing unit 610 that is a brush or a roller for removing powder that has adhered to its surface. According to need, there can also be provided a discharging unit for removing charges remaining on the intermediate transfer body (belt) 617 after the image has been transferred to the recording material, or a charging unit for making these charges uniform.

The recording material onto which an image is to be finally formed is accommodated in the recording material containing unit 631 (631*a*, 631*b*). The recording material is sent to a sheet conveying system by a sheet feeding roller 632 (632*a*, 632*b*), and is conveyed through a pair of sheet feeding rollers 633 (633*a*, 633*b*, 633*c*, 633*d*, 633*e*, 633*f*, 633*g*). The powder image that has been formed on the intermediate transfer body (belt) 617 is transferred onto a recording material by an electric field applying unit 642 such as a voltage charging roller and a corona wire electrifier.

The image forming substance that has been transferred onto the recording material is fixed with a fixing unit including a heating roller or a heating belt 644 and a pressurizing roller 645. The recording material on which the image has been fixed passes through a pair of sheet eject rollers 641 and is then ejected onto a sheet eject tray 640.

In the image forming apparatus illustrated in FIG. 10, two recording material containing units 631*a* and 631*b* are provided. The recording material containing unit 631*a* accommodates general recording materials, and the recording material containing unit 631*b* accommodates reusable recording materials that are coated with a plastic material that decreases the fixing properties with respect to the image forming substance. Furthermore, there can be more recording material containing units provided for accommodating recording materials of different sizes and recording materials that are set in different directions (vertical, horizontal).

The user can select whether to form images in a first mode or a second mode, with an operation panel (not shown in FIG. 10), or with a user interface displayed on a display panel connected to a computer which is connected to the image forming apparatus. The first mode can be selected in the operation panel or the user interface displaying buttons and options indicating "reuse", "paper reuse", "reuse mode", "special-purpose paper", "reusable paper", "resource saving", "short term viewing", and "short term usage". In the first mode, a reusable recording material is supplied from the recording material containing unit (cassette) 631*b*, and an image is formed on the reusable recording material.

In FIG. 10, 671 denotes a sensor for reading whether there is information attached to the reusable recording material for identifying that the material is a reusable recording material. The reusable recording material is provided beforehand with a notch, a hole, or a barcode, as identification information indicating that the material is a reusable recording material, which can have its image removed by the image removing device according to an embodiment of the present invention. The sensor 671 detects whether there is identification information, and sends a signal to a print control unit (not shown). Even if an instruction is given to print images in the first mode, but the recording material conveyed does not have such identification information, the print control unit will not print images in the first mode, and will eject the recording material to the sheet eject tray 640.

When printing in the first mode, the print control unit (not shown) will form an image requested by the user on a reusable recording material provided with identification information indicating that the material is a reusable recording material. Furthermore, identification information for identifying that the printing was performed in the first mode is preferably recorded in one of the corners of the reusable recording material.

The second mode can be selected in the operation panel or the user interface displaying buttons and options indicating "fixing mode", "high fixing property", "fix mode", "plain paper", "new paper", "save document", and "external distribution". In the second mode, generally-used paper, i.e. so-called plain paper, is supplied from the recording material containing unit (cassette) 631*a*, and an image is formed on the plain paper.

It is possible to set the first image forming mode as the priority mode, so that the first mode is automatically selected without requiring the user to make a selection. Only when the user wishes to form images in the second mode, the user would be required to select the second mode. It is preferable to provide a unit with which either the first mode or the second mode can be set as the mode to be automatically selected without the user's selection. Accordingly, the user would be able to change the priority mode in a case-by-case manner, and the mode that is frequently used can be automatically selected without requiring the user to make a selection.

When the first mode is selected either manually by the user or automatically, the control unit of the image forming apparatus determines whether there is reusable recording materials from which images can be removed, and whether a mode prohibited when forming images in the first mode such as double-sided printing is not selected. For example, stapling the sheets or opening binding holes in the sheets is considered to make the recording material difficult to reuse. Therefore, if a stapler or a binding-hole-opening unit is connected to the image forming apparatus, and can be controlled by the image forming apparatus, it is preferable to prohibit the usage of the stapler or the binding-hole-opening unit in the first mode.

In FIG. 10, the portion surrounded by a dotted line 650 corresponds to the image removing device. In the image removing device shown in FIG. 10, the elements having the same functions as those of the above described image removing devices are denoted by the same reference numbers. The image removing device includes the recording material containing unit (sheet feeding cassette) 102 for accommodating recording materials from which images are to be removed, the sheet feeding roller 103 for sending out the recording material to the image removing process unit, the heating/pressurizing roller 111 having a halogen lamp 116 provided inside as the heat source, the roller peeling member 121, and the transfer cleaning roller 131, etc. This system example further includes a first mode printing identification mark detecting unit 664, a recording material containing unit 661 for accommodating recording materials from which images cannot be removed, a guide plate 662 for guiding the recording material to the recording material containing unit 661, a movable guide plate 667, and a pair of sheet eject rollers 663.

The recording material from which an image is to be removed is set in the recording material containing unit (sheet feeding cassette) 102. When the first mode printing identification mark detecting unit 664 for detecting whether there is a mark for identifying that an image has been formed in the first mode, does not detect any information indicating that printing has been performed in the first mode on the recording material about to be supplied to the image removing unit, the movable guide plate 667 is controlled to rotate to the position indicated by the dotted line in FIG. 10. Then, the recording material conveyed by the sheet feeding roller 103 will not conveyed to the image removing unit, but will be ejected to the recording material containing unit 661 through the pair of sheet eject rollers 663. A recording material determined as having an identification mark indicating that an image has been formed in the first mode is guided by the movable guide plate 667 to be conveyed between the roller peeling member 121 and the heating/pressurizing roller 111.

The recording material from which the image has been removed is ejected to the recording material containing unit 631*b* by pairs of conveying rollers 681 and 682. When the recording material that has undergone the image removing process is to be ejected outside the image removing device, the sheet feeding roller 632*b* of the image forming apparatus is raised by a raising unit and a control unit which are not shown, to a position that will not obstruct the recording material from being accommodated in the recording material containing unit 631*b*. When the recording material has finished being conveyed by the pair of conveying rollers 682, the sheet feeding roller 632*b* will descend.

As described above, the image removing device according to an embodiment of the present invention can achieve stable image removing properties and stable separation properties for separating the recording material from the peeling member, by using a specific kind of image forming substance used in combination with a specific kind of image forming apparatus. Furthermore, by using a specific kind of reusable recording material in which the adhesive force between the image forming substance is constant, stable image removing properties and stable separation properties for separating the recording material from the peeling member can be achieved. By using a system having the above configuration, and by ensuring that the reusable recording materials are used, images can be reliably removed, and the recording material can be reliably separated from the peeling member, thereby maintaining the reliability of the image removing device.

In this example of an image forming/removing system, the image forming apparatus and the image removing device are provided in a single body. However, even if the image forming apparatus and the image removing device are provided in separate casings, it is obvious that the same effects can be achieved. Such a configuration configures the image forming/removing system according to another embodiment of the present invention.

Specific Example 1

A specific example 1 including an image removing device, an image removing method, and an image forming/removing system are described with reference to FIGS. 1 and 11.

| (Image forming substance) | |
|---|---|
| Thermoplastic composition layer: | |
| polyester resin | 100 parts by weight |
| Parting agent: | |

-continued

| (Image forming substance) | |
|---|---|
| carnauba wax | 4 parts by weight |
| Charge control agent | |
| zinc salicylate | 1 part by weight |
| Colorant | |
| carbon black | 12 parts by weight |

The above prescribed amounts of components underwent preliminary kneading with the use of a mixer. The components that had undergone preliminary kneading then underwent a melting/kneading process with the use of a two roll mill. Next, this kneaded product was cooled, and was then coarsely ground with a hammer mill to have sizes of approximately 0.5 mm through 3 mm. This was further ground with a jet grinding machine to be separated into powder particles having an average particle diameter of 7.1 μm.

In 100 parts by weight of the above powder, 6 parts by weight of microscopic silica powder having an average particle diameter of 0.140 μm was mixed together. This was stirred with a Henschel mixer, and was then sifted, thereby obtaining black toner.

It was found that the softening temperature of this toner was 85° C. by measuring it with a flow tester.

Figure 11:
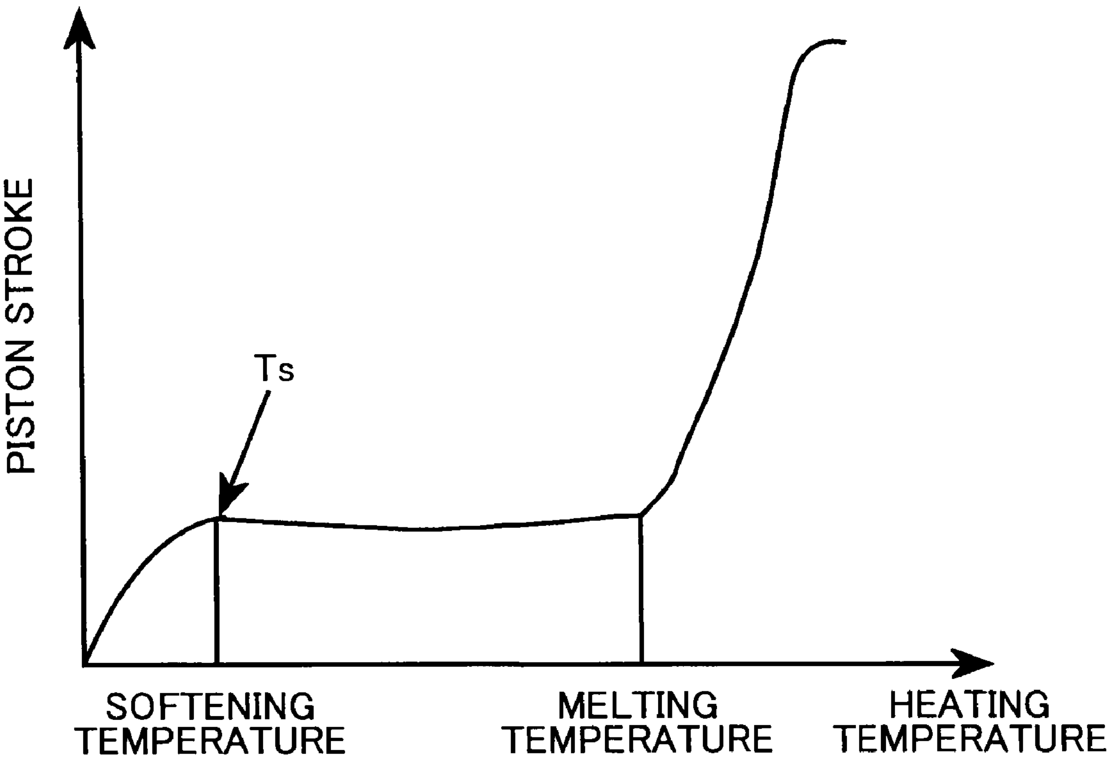
FIG. 11 illustrates a flow curve of toner obtained with a flow tester.

The softening temperature was obtained from the flow curve as shown in FIG. 11, with the use of an overhead flow tester CFT-500 (manufactured by Shimadzu Corporation).

The measurement was performed under the conditions of load: 10 kg/cm$^2$, rate of temperature rise: 3.0° C./min, die aperture: 0.50 mm, die length: 1.0 mm, and the point Ts in the flow curve was defined as the softening temperature.

Instead of carbon black in the above prescription, 6 parts by weight of C.I. pigment yellow 180, 7 parts by weight of C.I. pigment red 122, and 6 parts by weight of C.I. pigment blue 15:3 were used. Otherwise, the same processes were performed to obtain toner of yellow, magenta, and cyan. Toner of colors other than black also had a softening point of 85° C.

(Peeling Member)

A shaft was fitted into a steel pipe having a thickness of 3 mm, an outer diameter of 32 mm, and a width of 320 mm, thereby obtaining a cored bar for the roller. A polyimide tube having a thickness of 40 μm, an outer diameter of 40 mm, and a width of 340 mm was fabricated by a centrifugal application method. The polyimide tube and the cored bar were set in a die. A silicon gum material was poured in between the cored bar and the polyimide tube, and was cured, so that polyimide was formed as the intermediate adhesive layer. Accordingly, an unfoamed silicon gum roller (member for forming peeling member) having a rubber elastic layer with a thickness of 4 mm was obtained (rubber hardness was 30° according to JIS K6301A (Japanese Industrial Standard)).

The toner fabricated as described above was mixed together with carriers to obtain a developer, which was set in the developing unit of an electrophotographic multifunctional image forming apparatus imagio Neo C285 manufactured by Ricoh Company, Ltd. A release coated paper sheet provided with a silicon resin on both sides was prepared, and a blue solid image was formed. Instead of the roller peeling member 121 shown in FIG. 1, the roller fabricated as above including the intermediate adhesive layer was set. The temperature of the heating/pressurizing roller was set to 130° C., and the heating/pressurizing roller was heated. Under these conditions, the release coated paper sheet with the solid image was passed through these rollers at a speed of 40 mm/sec. As a result, the solid image on the release coated paper sheet was completely transferred onto the roller with the intermediate adhesive layer. Then, four release coated paper sheets with solid images were consecutively passed through these rollers, and all of the four images were transferred to the roller. In this manner, a thermoplastic composition layer having a thickness of 32 μm was formed on a roller peeling member, with the use of the toner fabricated as above. The outer diameter of this roller peeling member is approximately 40 mm.

(Reusable Recording Material)

A coating liquid was prepared by mixing together 1 part by weight of a 25 wt % aqueous solution of an olefin-maleic anhydride polymer saponification product and 8 parts by weight of a 12 wt % aqueous solution of oxidized starch. This coating liquid was applied on both sides of a commercially available plain paper sheet (Ricoh copy paper Type 6200) with the use of a wire bar so that the dried application amount on one side became 3.5 g/m$^2$. Then, the sheet was dried for 5 minutes in a temperature of 120° C. A smoothening process was performed with a super calendar. Accordingly, a reusable recording material was obtained. The surface smoothness of the reusable recording material was 285 seconds, which was measured according to JIS (Japanese Industrial Standard) P8119.

(Image Formation)

The reusable recording material fabricated as above was used in the imagio Neo C285, to print a full-color pattern including a gradation image, solid images of a second color and a monochrome color, and character images. As a result, the printed image was clear.

Furthermore, a cotton cloth was pressed against a black halftone image portion having a different density in the obtained image (area ratio 15% through 60%), and was rubbed against this portion back and forth for five times. Then, it was found that the density of the image forming substance that had transferred to the cotton cloth was 0.06, which can sustain practical use.

It is possible to write on this reusable recording material with a commercially available, generally used pencil, ballpoint pen, and oil-based marker. There were no paper jamming, resist failures, or paper skews in the image forming apparatus or the image removing device.

(Repetition of Image Removing Process and Image Formation)

The device shown in FIG. 1 was used to remove the image forming substance from the reusable recording material on which an image has been formed in the above manner. The conditions when removing the image were as follows.

Process linear speed (circumferential speed of roller peeling member): 40 mm/sec Set temperature of heating/pressurizing roller: 125° C.

Pressure applied between heating/pressurizing roller and peeling member: a force of 150 N was applied to both sides of the roller shaft Rotation angle θ from nip portion outlet to separation position: 120°

$$D\theta/V=2.1$$

Separation angle: 20°

Set temperature of transfer cleaning roller: 145° C.

Circumferential speed of transfer cleaning roller: 260 mm/sec

Transfer cleaning roller conveying direction: direction counter to that of the surface of the roller peeling member Under the above conditions, the image forming substance on the recording material was completely removed. On the same recording material, which had been regenerated by having the image forming substance removed, the image of the same pattern was formed, and the image forming substance was removed once again. This cycle of operations was repeated ten times. It was found that even in the image formed for the tenth time, there were no significant changes in the image, the density of background fogging did not increase, and the image was as clear as the image formed the first time. Furthermore, when the image forming substance on the recording material was removed for the tenth time, the same results as those of the first time were obtained. That is, the toner was completely removed from the recording material, including those of low density gradation images, the toner scattered around the image, and the toner forming background fogging.

Furthermore, when an image forming substance was removed from a recording material after the image removing device had continuously operated with the use of the same roller peeling member to remove image forming substances from 2,000 sheets, the same results as those of the first time were obtained. That is, the toner was completely removed from the recording material, including those of low density gradation images, toner scattered around the image, and toner forming background fogging.

A reusable recording material having attached a thermocouple made of extra fine wire, was used as the above described reusable recording material from which an image is to be removed. This reusable recording material was inserted into the nip formed by the roller peeling member and the heating/pressurizing roller. The difference in the temperature of the reusable recording material in the nip and after passing through the nip was measured. Immediately after passing through the nip, the temperature of the recording material reached 117° C., but at the separation position at θ=120°, the temperature of the recording material decreased to 98° C.

Next, a description is given of comparative examples 1 through 5 of image removing processes performed with the use of the image removing device (comparative example of image removing device) including the endless-belt type peeling member shown in FIG. 9, instead of the image removing device according to the first embodiment of the present invention shown in FIG. 1.

Comparative Example 1

The same reusable recording material, image forming substance, and image forming apparatus as those of the specific example 1 were used. The peeling member was formed by providing an image forming substance layer having a thickness of 32 μm on a polyimide film having a circumferential length of 650 mm and a thickness of 150 μm.

The conditions when removing the image were as follows.

Process linear speed (circumferential speed of roller peeling member): 40 mm/sec Set temperature of heating roller 411: 125° C.

Pressure applied between heating roller 411 and pressurizing roller 422: a force of 50 N was applied to both sides of the roller shaft Diameter of separation roller 424: 15 mm Separation angle: 0° (reusable recording material is substantially horizontally separated and conveyed)

Distance from position of nip formed by heating roller and pressurizing roller to separation position: 185 mm Air blown after passing through nip portion until reach separation position: none Set temperature of transfer cleaning roller: 145° C.

Circumferential speed of transfer cleaning roller: 260 mm/sec

Transfer cleaning roller conveying direction: direction counter to that of the surface of the endless-belt-type peeling member Under the above conditions, an image removing process was performed; however, approximately 72% of the image remained on the recording material. Thus, the reusable recording material that had undergone the removing process was not one that can sustain practical use.

As in the above specific example 1, a reusable recording material having attached a thermocouple made of extra fine wire was used as the above described reusable recording material from which an image is to be removed. This reusable recording material was inserted into the nip formed by the heating roller 411 and the pressurizing roller 422 (between heating roller/peeling member belt). The difference in the temperature of the reusable recording material in the nip and after passing through the nip was measured. Immediately after passing through the nip, the temperature of the recording material reached 117° C., but at the separation position, the temperature of the recording material decreased to 72° C.

Comparative Example 2

In comparative example 2, a cooling operation was performed with a fan from when the recording material passed through the nip portion until it reached the separation position. Otherwise, the image removing process was performed in the same manner as comparative example 1. Approximately 34% of the image remained on the recording material. Thus, the reusable recording material that had undergone the removing process was not one that can sustain practical use.

As in the above comparative example 1, a reusable recording material having attached a thermocouple made of extra fine wire was used as the above descried reusable recording material from which an image is to be removed. This reusable recording material was inserted into the nip formed by the heating roller 411 and the pressurizing roller 422 (between heating roller 411/peeling member belt 421). The difference in the temperature of the reusable recording material in the nip and after passing through the nip was measured. At the separation position, the temperature of the recording material decreased to 34° C.

Comparative Example 3

In comparative example 3, the separating angle of the reusable recording material was set at 20° (a separating claw was set so as to raise the reusable recording material 20° above a horizontal position). Otherwise, the image removing process was performed in the same manner as comparative example 1. Approximately 28% of the image remained on the recording material. Thus, the reusable recording material that had undergone the removing process was not one that can sustain practical use.

Comparative Example 4

In comparative example 1, the separation was performed at 185 mm downstream from the nip formed by the heating roller 411 and the pressurizing roller 422. However, in comparative example 4, the separation roller 424 was located 25 mm downstream from the nip. Furthermore, the separation angle of the reusable recording material was set at 20°. Other conditions were the same as those of comparative example 1 in performing the image removing process. Approximately 55% of the image remained on the recording material. Thus, the reusable recording material that had undergone the removing process was not one that can sustain practical use.

As indicated by the above specific example 1 and comparative examples 1 through 4, a roller peeling member is more advantageous than an endless-belt-type peeling member in the following respect. That is, after heat and pressure are applied to the image forming substance on a recording material and the peeling member superposed on each other, good image removing properties can be achieved even if the recording material is separated from the roller peeling member at high temperature. Conversely, when an endless-belt-type peeling member is used, after heat and pressure are applied to the image forming substance on a recording material and the peeling member superposed on each another with the same conditions as the roller peeling member, and the temperature at the time of separation is lower than or equal to that of the roller peeling member, the image removing properties are inferior to the case of using the roller peeling member.

Comparative Example 5

The transfer cleaning roller was made to follow the rotation of the roller peeling member. The transfer cleaning roller was rotated in an opposite direction to that of the specific example 1 and at substantially the same circumferential speed as that of the roller peeling member. Otherwise, in the same manner as that of specific example 1, recording materials with images were continuously passed through the image removing device. With the peeling member in the initial state, the image forming substance on the recording material was completely removed. However, from and beyond the 18th recording material, images remained on the recording material that had undergone the image removing process.

When the transfer cleaning roller is caused to follow the rotation of the roller peeling member, hardly any of the image forming substance, which had transferred from the recording material to the roller peeling member, was transferred to the transfer cleaning roller. Moreover, the irregularities on the surface of the roller peeling member became larger compared to when the process of continuously passing through the recording materials had just started. Accordingly, it was assumed that the reason why images remained on (were not removed from) the recording material was because the image forming substances that had been transferred from the recording material to the roller peeling member had built up without being removed. As a result, irregularities on the surface of the roller peeling member became large, and the thermoplastic composition layer became too thick.

Specific Example 2

Next, a specific example 2 including an image removing device, an image removing method, and an image forming/removing system are described with reference to FIGS. 1 and 6.

Instead of the image removing device of the first embodiment shown in FIG. 1 used in specific example 1, the image removing device of the second embodiment shown in FIG. 6 having the forced cooling unit was used to perform the image removing process. Furthermore, the process conditions were as described below. Otherwise, the image removing process was performed in the same manner as specific example 1. That is, the same roller peeling member, developer, reusable recording material and image forming apparatus as those used in specific 1 were used to perform the image removing process with the image removing device shown in FIG. 6.

Process linear speed (peeling member conveying speed): 60 mm/sec

Set temperature of heating/pressurizing roller: 135° C.

Pressure applied between heating/pressurizing roller and peeling member: a force of 150 N was applied to both sides of the roller shaft Rotation angle θ from nip portion outlet to separation position: 120°

Separation angle: 40°

Set temperature of transfer cleaning roller: 165° C.

Circumferential speed of transfer cleaning roller: 300 mm/sec

Forced cooling fan: present

Under the above conditions, the image forming substance on the recording material was completely removed. On the same recording material, which had been regenerated by having the image forming substance removed, the image of the same pattern was formed, and the image forming substance was removed once again. This cycle of operations was repeated ten times. It was found that even in the image formed for the tenth time, there were no significant changes in the image, the density of background fogging did not increase, and the image was as clear as the image formed the first time. Furthermore, when the image forming substance on the recording material was removed for the tenth time, the same results as those of the first time were obtained. That is, the toner was completely removed from the recording material, including those of low density gradation images, the toner scattered around the image, and the toner forming background fogging.

According to an aspect of the present invention, there is provided an image removing device for removing an image forming substance having thermoplastic properties from a recording material, the image removing device including a roller peeling member onto which the recording material with the image forming substance is superposed; a heating unit configured to heat the image forming substance; a pressurizing unit configured to apply pressure to the roller peeling member and the recording material superposed thereon to cause the image forming substance heated by the heating unit to adhere to the roller peeling member; a separating unit configured to separate the recording material from the roller peeling member after the image forming substance has adhered to the roller peeling member, thereby removing the image forming substance from the recording material and transferring the image forming substance to the roller peeling member; and a removing unit configured to remove, from the roller peeling member, the image forming substance that has been transferred from the recording material to the roller peeling member, wherein the removing unit includes a transfer cleaning member whose surface is made of a material having adhesive properties with respect to the image forming substance, whereby the transfer cleaning member is not rotated by the roller peeling member, but is driven/conveyed in such a manner that the transfer cleaning member and the roller peeling member pressurize/contact/slide against each other, so that the image forming substance that has been transferred from the recording material to the roller peeling member is temporarily transferred to the transfer cleaning member before subsequently being removed from the transfer cleaning member.

Additionally, according to an aspect of the present invention, the image removing device further includes a driving unit configured to drive/convey the transfer cleaning member such that a surface conveying speed of the transfer cleaning member is higher than a circumferential speed of the roller peeling member.

Additionally, according to an aspect of the present invention, the image removing device further includes a peeling member heating unit configured to heat the image forming substance on the recording material superposed on the roller peeling member, whereby the peeling member heating unit is not provided inside the roller peeling member but is provided only on the outside of the roller peeling member, wherein the roller peeling member has a thermoplastic composition layer formed on its surface; and the separating unit is provided at a separation position that is on a downstream side of a nip portion outlet formed by the pressurizing unit and the roller peeling member, wherein temperatures of the image forming substance on the recording material and the thermoplastic composition layer formed on the surface of the roller peeling member become lower at the separation position than a temperature of the nip portion outlet.

Additionally, according to an aspect of the present invention, in the image removing device, the separating unit is provided at the separation position where $D\theta/V>0.5$ is satisfied, assuming that a diameter of the roller peeling member is D (mm), an image removing linear speed is V (mm/sec), and a rotation angle around the roller peeling member is $\theta$ (rad), which corresponds to an angle between the nip portion outlet formed by the pressurizing unit and the roller peeling member and the separation position where the recording material is separated from the roller peeling member; and the image forming substance on the recording material and the thermoplastic composition layer formed on the surface of the roller peeling member are naturally cooled after exiting the nip portion outlet until reaching the separation position, without providing a forced cooling unit between the nip portion outlet and the separation position.

Additionally, according to an aspect of the present invention, the image removing device further includes a forced cooling unit configured to forcibly cool the image forming substance on the recording material and the thermoplastic composition layer formed on the surface of the roller peeling member, the forced cooling unit being provided at a position which is on the downstream side of the nip portion outlet formed by the pressurizing unit and the roller peeling member, and on an upstream side of the separation position where the recording material is separated from the roller peeling member by the separating unit.

Additionally, according to an aspect of the present invention, the image removing device further includes a transfer cleaning member heating unit configured to heat the transfer cleaning member; a controlling unit configured to control the temperature of the image forming substance that has been transferred onto the surface of the roller peeling member at a portion where the roller peeling member and the transfer cleaning member contact and slide against each other, so as to be higher than the temperature of the image forming substance at the separation position where the recording material is separated from the roller peeling member by the separating unit, thereby causing cohesion failure in the image forming substance, so that the image forming substance on the surface of the roller peeling member is transferred to the transfer cleaning member to remove the image forming substance that has been transferred from the recording material onto the roller peeling member.

Additionally, according to an aspect of the present invention, in the image removing device, the separating unit is provided in such a manner that the recording material is separated from the roller peeling member at a separation angle of more than or equal to 5° with respect to a tangential direction of the roller peeling member.

Additionally, according to an aspect of the present invention, there is provided an image removing method including a step of removing an image formed on a reusable recording material by using the above image removing device, in the event that information on the reusable recording material has become unnecessary, wherein the reusable recording material has its surface coated with a composition configured to decrease an adhesive force with respect to the image forming substance; and the image has been formed on the reusable recording material with the use of the image forming substance having thermoplastic properties.

Additionally, according to an aspect of the present invention, in the image removing method, a surface smoothness of at least one side of the reusable recording material is less than or equal to 500 seconds; and the image is formed on the side of the reusable recording material whose surface smoothness is less than or equal to 500 seconds.

Additionally, according to an aspect of the present invention, there is provided an image forming/removing system for repeatedly using the same recording material, including a conveying unit configured to supply a recording material to an image forming unit from a container accommodating the recording material, wherein the recording material includes information used for identifying whether the recording material is a reusable recording material; an image forming apparatus including the image forming unit configured to form an image on the recording material; and the above image removing device.

Additionally, according to an aspect of the present invention, there is provided an image forming/removing system for repeatedly using the same recording material, including the above image removing device, wherein the roller peeling member has a thermoplastic composition layer formed on its surface, whereby the thermoplastic composition layer is made of the same composition as that of the image forming substance used in an image forming apparatus, or a composition near that of the image forming substance used in the image forming apparatus which is obtained by removing some components included in the image forming substance; and the image forming apparatus.

Additionally, according to an aspect of the present invention, in the image forming/removing system, the image forming apparatus includes an electrophotographic image forming apparatus configured to form an image on the recording material with the use of the image forming substance including thermoplastic powder, the electrophotographic image forming apparatus including a heat-fixing unit configured to heat-fix the image formed on the recording material by pressing the image against a heated member; and the electrophotographic image forming apparatus forms the image with the use of the image forming substance including a wax component of more than or equal to 1 wt % with respect the total weight of the image forming substance.

According to an embodiment of the present invention, the following effects may be achieved. A roller peeling member is used in the image removing device, and therefore difficult problems that accompany an endless-belt-type peeling member, such as displacement of the belt, can be avoided. Furthermore, in the cleaning method of removing the image forming substance that has been transferred from the recording material, the image forming substance is temporarily transferred to the transfer cleaning member. The image forming substance can be removed from the peeling member having a thermoplastic composition layer provided on its surface. In the image removing device using a roller peeling member, a driving force can be directly applied to the roller shaft. Therefore, even if there is a large frictional force between the cleaning member for removing the image forming substance on the peeling member, the roller peeling member and the transfer cleaning member can be stably driven.

Furthermore, as the peeling member is a roller, there will be no changes in the curvature of the peeling member between the step of making the image forming substance on the recording material adhere to the peeling member until the step of separating the recording material from the peeling member, thereby achieving good image removing properties. Furthermore, compared to the case of using an endless-belt-type peeling member, the size of the image removing device can be smaller, the speed of the image removing process can be higher, and the peeling member can be repeatedly used for a longer period of time.

In an embodiment of the present invention, the transfer cleaning member is driven/conveyed such that its conveying speed exceeds the circumferential speed of the roller peeling member. Thus, the contact area per unit time between the transfer cleaning member and the image forming substance transferred to the roller peeling member becomes large. For this reason, it is possible to effectively heat the image forming substance that has temporarily decreased in temperature and that has increased in cohesion force at the separation position where the recording material was separated from the peeling member. Consequently, the image forming substance on the roller peeling member will be transferred to the transfer cleaning roller with good performance, and stable image removing properties can be achieved even after repeating the image removing process for a long period of time. In the image removing process, the cleaning step of removing the image forming substance from the peeling member is the rate-determining step, rather than the step of transferring the image forming substance from the recording material to the peeling member. However, by performing the cleaning method by transferring the image forming substance to the transfer cleaning roller, the image removing process can be performed at high speed.

By providing a thermoplastic composition layer on the surface of the roller peeling member, it is possible to even remove images on a recording material with considerable irregularities, low density gradation images, color images, and background fogging. Furthermore, the roller peeling member does not have a heat source provided inside. Therefore, after passing through the nip section for heating/pressurizing the recording material and the peeling member, and until reaching the position where the recording material and the peeling member are separated from each other, the image forming substance on the recording material and the thermoplastic composition layer on the peeling member would be cooled and their cohesive forces would increase. As a result, cohesion failure is prevented from occurring when the recording material and the peeling member are separated, thereby achieving good image removing properties. Furthermore, the transfer cleaning member is configured to slide against the roller peeling member. Therefore, even if the image forming substance that has been transferred to the roller peeling member is cooled, the image forming substance on the roller peeling member can be easily heated/transferred, and the thickness of the thermoplastic composition layer on the peeling member can be maintained at a constant thickness. Accordingly, even after repeatedly using the peeling member, the image forming substance can be removed in a stable manner.

The roller peeling member does not have a heat source provided inside. Furthermore, the separation position is arranged such that it takes a certain amount of time from when the recording material and the peeling member, which are superposed on each other, exit a nip portion outlet where they are heated/pressurized, to when the recording material and the peeling member are separated from each other at a downstream position. Accordingly, by the time of the separation, the image forming substance on the recording material will be cooled so that a cohesion failure does not occur, thereby achieving good image removing properties. Furthermore, even without using a forced cooling unit such a fan, it is possible to achieve good properties in separating the recording material from the peeling member and removing the image from the peeling unit, thereby achieving an image removing device with a simple structure at low cost.

The roller peeling member does not have a heat source inside. After passing through the nip section formed by the pressurizing member and the roller peeling member at which the image forming substance on the recording material is caused to adhere to the peeling member, and until reaching the position where the recording material and the peeling member are separated from each other, the image forming substance on the recording material and the thermoplastic composition layer on the peeling member are cooled by a forced cooling unit such as a fan. Therefore, even if the diameter of the roller peeling member is reduced or the image removing process speed is increased, cohesion failure will not occur in the image forming substance on the recording material or the thermoplastic composition layer on the roller peeling member. Accordingly, image removing properties and separation properties for separating the recording material and the peeling member will not be degraded.

The temperature of the cleaning unit for removing the image forming substance from the peeling member is set/controlled so as to be high. Thus, the cohesive force of the image forming substance on the surface of the peeling member decreases, so that the image forming substance on the peeling member transfers to the transfer cleaning roller with good performance, and stable image removing properties can be achieved even after the peeling member has been repeatedly used. Meanwhile, at the separation position where the recording material is separated from the peeling member, the thermoplastic composition layer on the surface of the peeling member and the image forming substance is cooled to a relatively low temperature, so that the cohesive force of the image forming substance becomes high and cohesion failure does not occur. Thus, cohesion failure will not occur at the time of separation, and good image removing properties will be achieved.

When separating the recording material from the roller peeling member, the curvature of the recording material changes considerably. Due to this change in curvature, a shearing force functions between the recording material and the image forming substance, and therefore the adhesive force between the recording material and the image forming substance decreases. As a result, good image removing properties can be achieved. Particularly, when a roller peeling member without a heat source provided inside is used, the following can be achieved. At the separation position, the image forming substance on the recording material is cooled and the cohesive force increases. Thus, when the curvature of the recording material changes, the image forming substance will not be able to flow in accordance with the change of curvature, and as a result, an even higher shearing force will function.

Furthermore, as the peeling member is a roller, there will be no changes in the curvature of the peeling member from when the image forming substance on the recording material adheres to the peeling member until the recording material and the peeling member are separated. Therefore, there will be no shearing force functioning between the image forming substance on the recording material and the peeling member due to curvature changes, and the adhesive force will be maintained, thereby achieving excellent image removing properties.

In the image removing device according to an embodiment of the present invention having excellent image removing properties, by using a reusable recording material having its surface coated with a composition for decreasing the adhesive force with respect to the image forming substance, the image forming substance on the recording material can be removed by a heat transfer method without the need of applying an image removal accelerating liquid. Thus, the image removing device can have a simple structure, and also there is no need to dry the image removal accelerating liquid applied to the recording material, and therefore consumes less power for the image removing process. The image removing device according to an embodiment of the present invention having excellent image removing properties can remove images, even if the reusable recording material has a practical level of image fixing properties.

By using the image removing device according to an embodiment of the present invention having excellent image removing properties, even when a reusable recording material having a surface smoothness of less than or equal to 500 seconds is used, the image forming substance on the recording material can be completely removed. By making the reusable recording material have a surface smoothness of less than or equal to 500 seconds, practical fixing properties of images can be achieved, and it will be possible to write on such recording materials with writing instruments such as pencils and ball-point pens.

By using an image forming/removing system including a combination of an image forming apparatus and the image removing device according to an embodiment of the present invention, even after repeating the image removing process, the composition of the thermoplastic composition layer on the surface of the roller peeling member will not change. Therefore, stable image removing properties and stable separating properties of separating the recording material from the peeling member can be achieved. If various image forming substances are transferred to the roller peeling member, the adhesiveness of the surface of the peeling member with respect to the recording material will change. Thus, images cannot be removed stably, and even worse, it will be difficult to separate the recording material and the peeling member from each other. As a result, paper jamming may occur or the recording material may adhere to the peeling member, making it difficult to use the image removing device. In the image forming apparatus and the image removing device, reusable recording materials can be identified, so that only reusable recording materials are conveyed to the image removing unit of the image removing device. This prevents a troublesome situation where general recording materials that are not reusable recording materials get mixed in the image removing unit, and the recording material adheres to the peeling member such that it cannot be separated from the peeling member.

By using an image forming/removing system including a combination of an image forming apparatus and the image removing device according to an embodiment of the present invention, and making the thermoplastic composition layer on the surface of the roller peeling member in the image removing device have an initial composition that is near that of the image forming substance used in an image forming apparatus, the following advantages may be achieved. That is, even after repeatedly removing image forming substances from recording materials, the change in the composition of the thermoplastic composition layer can be minimized, and changes in the adhesiveness of the thermoplastic composition layer with respect to the recording material and the image forming substance can be minimized. Accordingly, stable image removing properties of removing the image forming substance and stable separating properties of separating the recording material from the peeling member can be achieved.

Wax is included as a parting agent in the thermoplastic composition layer of the roller peeling member. Therefore, good separating properties of separating the recording medium from the peeling member can be achieved. Furthermore, the thermoplastic composition layer can be prevented from adhering to the heating/pressurizing member. In an image forming/removing system which includes a combination of an image forming apparatus that uses an image forming substance including wax as the parting agent to form images and the image removing device having wax included as a parting agent in the thermoplastic composition layer of the roller peeling member, even by repeating the image removing process, the wax serving as the parting agent is constantly supplied to the thermoplastic composition layer on the roller peeling member, and therefore the above effects can be maintained.

[Recording Material that can be Used in Present Invention]

A description is given of a recording material that can be used in the image removing device, the image removing method, and the image forming/removing system.

The image removing method according to an embodiment of the present invention uses a reusable recording material having its surface coated with a composition for decreasing the adhesive force with respect to the image forming substance. An image is formed on such as reusable recording material with the use of a thermoplastic image forming substance. When information on the recording material is no longer necessary, the image removing device according to an embodiment of the present invention removes the image formed on the reusable recording material.

The inventors of the present invention conducted research, and found that when an image is printed onto a generally used sheet with the use of a general electrophotographic image forming apparatus that is commercially available, it is impossible to remove the image from the sheet with the heat-transfer type image removing device according to an embodiment of the present invention. One reason is that the adhering force between the image and the sheet is stronger than the cohesive strength among the cellulose fibers forming the paper sheet. Therefore, if the image forming substance on the recording material is removed, the cellulose fibers will be separated. As described above, an image formed on a plain paper sheet can be removed by weakening the adhesive force between the sheet and the image forming substance, by applying an image removal accelerating liquid including water and a surface-active agent. However, there are problems as described in the section of the background of the invention. Thus, devices for removing images formed on plain paper sheets are yet to be practically realized.

Another reason why it is difficult to remove images formed on plain paper sheets is that there are irregularities on the surfaces of plain paper sheets. Generally, a plain paper sheet has multiple holes on its surface, which are approximately 20 μm through 40 μm deep. Therefore, when a powder image forming substance is transferred onto a plain paper sheet, the powder image forming substance enters these holes. Thus, even by using a peeling member having a thermoplastic composition layer on its surface, it is impossible to completely remove the image forming substance that has entered the holes.

In the image removing device according to an embodiment of the present invention, to remove an image on a recording material, a recording material having it surface coated with a composition for decreasing the adhesive force with respect to the image forming substance (referred to as "reusable recording material" in this specification) is preferably used, so that an image forming substance can be removed without using an image removal accelerating liquid such as an aqueous solution including a surface-active agent.

Many reusable recording materials are conventionally proposed. An example of a reusable recording material according to an embodiment of the present is a plain paper sheet that is impregnated or applied with a surface-active agent. For example, Japanese Laid-Open Patent Application No. H10-74025 discloses a sheet that is applied with a fluorochemical surfactant, a silicon-based surfactant, and a surfactant including a straight chain or branched chain alkyl group in which the total number of carbons in a molecule is more than or equal to eight. Examples of a fluorochemical surfactant are an anionic surfactant such as fluoro alkyl carboxylate and fluoro alkyl sulfonate, an amphoteric surfactant such as fluoro alkyl introduced betaine, a nonionic surfactant, and a cationic surfactant. Examples of the silicon-based surfactant are silicon oil such as epoxy modified silicon oil, alkyl modified silicon oil, aralkyl modified silicon oil, amino modified silicon oil, carboxyl modified silicon oil, alcohol modified silicon oil, fluorine modified silicon oil, and polyether modified silicon oil. Examples of the surfactant including a straight chain or branched chain alkyl group in which the total number of carbons is more than or equal to eight are an anionic surfactant such as alkyl carboxylate, alkyl sulfuric ester salt, alkyl sulfonate, and alkyl phosphate, a cationic surfactant such as alkylamine salt, alkylamine derivative, quaternary ammonium salt, imidazoline, imidazolium salt, and an amphoteric surfactant such as betaine.

Another example of the reusable recording material according to an embodiment of the present invention is a reusable recording material having a silicon compound applied on its surface. A reusable recording material having a silicon compound applied on its surface is disclosed in, for example, Japanese Laid-Open Patent Application No. H9-204060 and Japanese Laid-Open Patent Application No. H9-204061. Specific examples of silicon compounds are a silicon resin and a silane coupling agent.

A reusable recording material having its surface coated a fluorine resin, an olefin resin, and wax is another example of a reusable recording material used in an image removing device according to an embodiment of the present invention.

A particularly preferable reusable recording material used for removing an image forming substance on a recording material with the image removing device according to an embodiment of the present invention is a sheet of paper disclosed in Japanese Laid-Open Patent Application No. 2006-78618, which is applied with olefin resin as a component for decreasing the fixing properties with respect to the image forming substance. In this reusable recording material, the olefin component of the olefin-maleic anhydride polymer is a high polymer compound that particularly has a double bond at the $\alpha$ position and that is polymerized with the use of an olefin monomer of carbon number 10 through carbon number 25. When images are printed on this reusable recording material with the use of a general electrophotographic image forming apparatus, it is possible to achieve practical fixing properties with respect to the image forming substance, and also remove the image forming substance from the reusable recording material.

When a monomolecular compound such as a surfactant and wax is used as the composition for decreasing the fixing properties with respect to the image forming substance, and the reusable recording material is repeatedly used or stored for a long period of time, the molecules of the compound are likely to be transferred to the peeling member or inside the reusable recording material. With such recording materials, it is difficult to achieve stable fixing properties with respect to the image forming substance or removing properties from the recording material. However, with a reusable recording material including an olefin-maleic anhydride polymer, the olefin-maleic anhydride polymer is a polymer and a high polymer compound, and therefore, the molecules will not be transferred. Thus, the reusable recording material can be repeatedly used many times, and stable fixing properties with respect to the image forming substance and stable removing properties of removing the image forming substance can be achieved, even after being stored for a long period of time.

By using high polymer compounds of the fluorine system or the silicon system as the composition for decreasing the fixing properties with respect to the image forming substance, the above-described transfer can be mitigated. However, reusable recording materials applied with such compounds are not practical because the fixing properties with respect to the image forming substance generally become too low. Moreover, such compounds are generally highly priced in the market, and therefore the cost of the reusable recording material will also increase. Furthermore, high polymer compounds of the fluorine system or the silicon system generally cannot be applied with a water solution or a water dispersion. Therefore, when manufacturing a reusable recording material, there will be problems in terms of safety and environmental load. Meanwhile, the saponified object in an olefin-maleic anhydride polymer is water soluble, and therefore the olefin-maleic anhydride polymer can be applied with the use of a saponified solution.

Furthermore, in recent electrophotographic image forming apparatuses, a parting agent such as wax is mixed in the image forming substance, and a so-called oil-less fixing unit including a fixing member without any oil applied is used. Such a configuration is becoming pervasive instead of the conventional fixing unit in which silicon oil is applied to a fixing member such as a fixing roller or a fixing belt in order to achieve parting properties with respect to the image forming substance. General paper sheets have a high adhesive force with respect to the image forming substance. Therefore, even if an oil-less fixing unit is used, offset to the fixing member will hardly occur. However, when a reusable recording material is used, the adhesive force with respect to the image forming substance is relatively low. Therefore, particularly when forming images with an image forming apparatus including an oil-less fixing unit, part of the image forming substance on the recording material will be transferred to the fixing member, such that fixing offset is likely to occur. In the case of using a reusable recording material in which a high polymer compound of the fluorine system or the silicon system is applied as the composition for decreasing the fixing properties with respect to the image forming substance, the adhesive properties with respect to the image forming substance will decrease too far. Consequently, it will be difficult to prevent fixing offset from occurring. Meanwhile, a reusable recording material including a hydrolysate of the olefin-maleic anhydride polymer, has less fixing properties with respect to the image forming substance, but has an appropriate adhesive force with respect to the image forming substance. Therefore, fixing offset will hardly occur even when forming images with an image forming apparatus using an oil-less fixing unit.

The image removing device according to an embodiment of the present invention has excellent image removing properties. Therefore, even when using a reusable recording material having a relatively high adhesive force with respect to the image forming substance and having excellent fixing properties with respect to the image, such as a reusable recording material including a hydrolysate of the olefin-maleic anhydride polymer, it will be possible to remove the image forming substance from the reusable recording material. Thus, the image removing device according to an embodiment of the present invention is provided with an oil-less fixing unit, and is used in combination with an image forming apparatus that forms an image with an image forming substance including wax. By using this combination as an image forming/removing system for repeatedly performing image forming processes and image removing processes on the same reusable recording material, significant effects can be achieved.

The reusable recording material is made by applying a composition for decreasing the fixing properties with respect to the image forming substance on a paper sheet or film serving as the base. When the base is made of a material with relatively large irregularities such as paper, the base is not only applied with a compound for decreasing the fixing properties with respect to the image forming substance, but is also applied with the following in order to reduce the irregularities on the reusable recording material. Specifically, a white pigment such as calcium carbonate, titanium oxide, zinc oxide, and barium sulfate, or a high polymer compound such as latex, styrene-butadiene polymer emulsion, acrylic resin, polyvinyl alcohol, starch, vinyl acetate polymer emulsion, carboxymethyl-cellulose, alginic acid, and gum arabic, is applied by being mixed together with the composition for decreasing the fixing properties with respect to the image forming substance, or applied to the base before applying the composition for decreasing the fixing properties with respect to the image forming substance.

In order to remove the image forming substance from the reusable recording material, the surface smoothness of the reusable recording material is preferably high. However, if the smoothness is too high, it will be difficult to convey the reusable recording material in the image forming apparatus and the image removing device, or the above-described fixing offset will be likely to occur. Furthermore, it will be difficult to write on the reusable recording material with pencils and ball-point pens. Particularly, reusable recording materials are coated with a composition for decreasing the fixing properties with respect to the image forming substance. Therefore, the friction coefficient on the surface is low. As a result, conveying rollers and writing instruments are likely to slip on the surface. In order to overcome these problems, the surface smoothness of the reusable recording material is preferably adjusted to less than or equal to 500 seconds (according to JIS (Japanese Industrial Standard), measured by the J TAPPI No. 5-B method (Smoothness according to the Oken system).

By using the image removing device according to an embodiment of the present invention, good image substance removing properties can be achieved. Therefore, even when a reusable recording material having a surface smoothness of less than or equal to 500 seconds is used, the image forming substance can be completely removed. However, if the reusable recording material is adjusted to have a surface smoothness of less than 130 seconds, the following problem may arise when used in an electrophotographic image forming apparatus. That is, when a powder-type toner is transferred onto the reusable recording material, the toner particles are not joined to each other (separate from each other), and are therefore likely to enter into the holes on the reusable recording material. As a result, it will be difficult to completely remove the image forming substance. For this reason, the surface smoothness is preferably more than or equal to 130 seconds.

By using the image removing device according to an embodiment of the present invention, an image formed on the above-described reusable recording material can be removed from the reusable recording material by a heat-transfer process, without applying an image removal accelerating liquid. In a method that requires application of an image removal accelerating liquid, it is difficult to remove the image forming substance in a case where an image forming substance film is formed on the recording material without any gaps therebetween, such as a color image. However, when a reusable recording material and the image removing device according to an embodiment of the present invention is used, there is no need to make the image removal accelerating liquid permeate the image forming substance, and therefore even color images can be removed. Furthermore, the image removing device according to an embodiment of the present invention is highly capable of removing images and separating the recording material from the peeling member, and can therefore perform the image removing operation and the separation operation even when a reusable recording material having high fixing properties with respect to the image forming substance is used.

[Image Forming/Removing System]

The image forming/removing system is further described.

Generally, in an image removing device that performs a heat-transfer method on the reusable recording material, a major problem will occur if plain paper sheets are mixed among the reusable recording materials. Specifically, the image forming substance firmly adheres to a plain paper sheet, and therefore it is impossible to separate the plain paper from the peeling member after the plain paper sheet on which an image is formed is superposed on the peeling member and heat and pressure are applied to make the image forming substance adhere to the peeling member. As a result, paper jamming may occur or the sheet may stick to the peeling member. Particularly, when the surface of the peeling member is provided with a thermoplastic composition layer, and a plain paper sheet approaches the peeling member, not only will the image portion but also the entire plain paper sheet will adhere to the peeling member. Thus, it would be absolutely impossible to separate a plain paper sheet from the peeling member. The adhesive force between a plain paper sheet and the thermoplastic composition layer on the surface of the peeling member is stronger than the cohesive force among the cellulose fiber in the plain paper sheet. Thus, by trying to forcibly separate the plain paper sheet from the peeling member, the cellulose fibers will be separated. As a result, in most cases, the peeling member cannot be used again.

Thus, the reusable recording material according to an embodiment of the present invention is provided with information indicating that the material is a reusable recording material, and the image removing device and the image forming apparatus include a unit for detecting this identification information. Furthermore, the image removing device is preferably provided with a unit for preventing a recording material without the identification information indicating that the material is a reusable recording material, from being conveyed to the image removing unit. Meanwhile, the image forming apparatus preferably includes a sheet feeding cassette dedicated for providing a reusable recording material attached with the identification information that the material is a reusable recording material and a unit for detecting the identification information attached to the reusable recording material in the sheet feeding path. Particularly, the image forming apparatus is provided with a detecting/controlling unit for recording information indicating that the image has been formed in the same machine (the image forming apparatus itself) when forming an image on the reusable recording material. Only when this image is detected, the recording material is conveyed to the image removing unit. With such an image forming/removing system, the above-mentioned problems can be prevented. The concept of such an image forming/removing system is disclosed in Japanese Laid-Open Patent Application No. 2005-128046. However, an embodiment of the present invention includes an image removing device having particularly good image removing properties, and therefore the above-described image forming/removing system can provide even more practical effects.

The above effects can be achieved with a system including the image removing device according to an embodiment of the present invention used in combination with an image forming apparatus of a predetermined machine type, or providing the image removing device according to an embodiment of the present invention as an option of the image forming apparatus. Furthermore, by using the image removing device according to an embodiment of the present invention in the above-described image forming/removing system, the above effects of the image forming/removing system can be achieved. That is, the thermoplastic composition layer formed on the surface of the roller peeling member initially provided in the image removing device before being used has a composition that is the same as that of the image forming substance used in the image forming apparatus or near that of the image forming substance obtained by removing some of the components from the image forming substance. Accordingly, even if the image removing process is repeated, the change in the composition of the thermoplastic composition layer is minimized. Consequently, stable image removing properties and stable separation properties for separating the recording material from the peeling member can be achieved.

Particularly, in an image forming/removing system including a combination of an image forming apparatus using an image forming substance including wax as the parting agent and the image removing device according to an embodiment of the present invention, even if the image removing process is repeatedly performed, a parting agent is constantly included on the surface layer of the roller peeling member of the image removing device. Therefore, the separating properties of separating the reusable recording material from the roller peeling member will be maintained. Furthermore, it is possible to prevent the thermoplastic composition on the peeling member from adhering to the heating/pressurizing member facing the roller peeling member.

The present invention is not limited to the specifically disclosed embodiment, and variations and modifications may be made without departing from the scope of the present invention.

The present application is based on Japanese Priority Patent Application No. 2007-264428, filed on Oct. 10, 2007, the entire contents of which are hereby incorporated herein by reference.

What is claimed is:

1. An image removing device for removing an image forming substance having thermoplastic properties from a recording material, the image removing device comprising:

a roller peeling member onto which the recording material with the image forming substance is superposed, the roller peeling member having a thermoplastic composition layer formed on its surface;

a heating unit configured to heat the image forming substance;

a pressurizing unit configured to apply pressure to the roller peeling member and the recording material superposed thereon to cause the image forming substance heated by the heating unit to adhere to the roller peeling member;

a separating unit configured to separate the recording material from the roller peeling member after the image forming substance has adhered to the roller peeling member, thereby removing the image forming substance from the recording material and transferring the image forming substance to the roller peeling member;

a removing unit configured to remove, from the roller peeling member, the image forming substance that has been transferred from the recording material to the roller peeling member;

a peeling member heating unit configured to heat the image forming substance on the recording material superposed on the roller peeling member, whereby the peeling member heating unit is not provided inside the roller peeling member but is provided only on the outside of the roller peeling member; and a forced cooling unit configured to forcibly cool the image forming substance on the recording material and the thermoplastic composition layer formed on the surface of the roller peeling member, wherein the removing unit comprises a transfer cleaning member whose surface is made of a material having adhesive properties with respect to the image forming substance, whereby the transfer cleaning member is not rotated by the roller peeling member, but is driven/conveyed in such a manner that the transfer cleaning member and the roller peeling member pressurize/contact/slide against each other, so that the image forming substance that has been transferred from the recording material to the roller peeling member is temporarily transferred to the transfer cleaning member before subsequently being removed from the transfer cleaning member, wherein the separating unit is provided at a separation position that is on a downstream side of a nip portion outlet formed by the pressurizing unit and the roller peeling member, wherein temperatures of the image forming substance on the recording material and the thermoplastic composition layer formed on the surface of the roller peeling member are lower at the separation position than a temperature of the nip portion outlet, and wherein the forced cooling unit is provided at a position which is on the downstream side of the nip portion outlet formed by the pressurizing unit and the roller peeling member, and on an upstream side of the separation position where the recording material is separated from the roller peeling member by the separating unit.

2. The image removing device according to claim 1, further comprising:

a driving unit configured to drive/convey the transfer cleaning member such that a surface conveying speed of the transfer cleaning member is higher than a circumferential speed of the roller peeling member.

3. The image removing device according to claim 1, wherein:

the separating unit is provided at the separation position where $D\theta/V>0.5$ is satisfied, assuming that a diameter of the roller peeling member is D (mm), an image removing linear speed is V (mm/sec), and a rotation angle around the roller peeling member is $\theta$ (rad), which corresponds to an angle between the nip portion outlet formed by the pressurizing unit and the roller peeling member and the separation position where the recording material is separated from the roller peeling member; and the image forming substance on the recording material and the thermoplastic composition layer formed on the surface of the roller peeling member are naturally cooled after exiting the nip portion outlet until reaching the separation position, without providing a forced cooling unit between the nip portion outlet and the separation position.

4. The image removing device according to claim 1, further comprising:

a transfer cleaning member heating unit configured to heat the transfer cleaning member; and a controlling unit configured to control the temperature of the image forming substance that has been transferred onto the surface of the roller peeling member at a portion where the roller peeling member and the transfer cleaning member contact and slide against each other, so as to be higher than the temperature of the image forming substance at the separation position where the recording material is separated from the roller peeling member by the separating unit, thereby causing cohesion failure in the image forming substance, so that the image forming substance on the surface of the roller peeling member is transferred to the transfer cleaning member to remove the image forming substance that has been transferred from the recording material onto the roller peeling member.

5. The image removing device according to claim 1, wherein:

the separating unit is provided in such a manner that the recording material is separated from the roller peeling member at a separation angle of more than or equal to 5° with respect to a tangential direction of the roller peeling member.

6. An image removing method comprising a step of removing an image formed on a reusable recording material by using the image removing device according to claim 1, in the event that information on the reusable recording material has become unnecessary, wherein:

the reusable recording material has its surface coated with a composition configured to decrease an adhesive force with respect to the image forming substance; and the image has been formed on the reusable recording material with the use of the image forming substance having thermoplastic properties.

7. The image removing method according to claim 6, wherein:

a surface smoothness of at least one side of the reusable recording material is less than or equal to 500 seconds; and the image is formed on the side of the reusable recording material whose surface smoothness is less than or equal to 500 seconds.

8. An image forming/removing system for repeatedly using the same recording material, comprising:

a conveying unit configured to supply a recording material to an image forming unit from a container accommodating the recording material, wherein the recording material comprises information used for identifying whether the recording material is a reusable recording material;

an image forming apparatus comprising the image forming unit configured to form an image on the recording material; and the image removing device according to claim 1.

9. An image forming/removing system for repeatedly using the same recording material, comprising:

the image removing device according to claim 1, wherein the roller peeling member has a thermoplastic composition layer formed on its surface, whereby the thermoplastic composition layer is made of the same composition as that of the image forming substance used in an image forming apparatus, or a composition near that of the image forming substance used in the image forming apparatus which is obtained by removing some components included in the image forming substance; and the image forming apparatus.

10. The image forming/removing system according to claim 9, wherein:

the image forming apparatus comprises an electrophotographic image forming apparatus configured to form an image on the recording material with the use of the image forming substance comprising thermoplastic powder, the electrophotographic image forming apparatus comprising a heat-fixing unit configured to heat-fix the image formed on the recording material by pressing the image against a heated member; and the electrophotographic image forming apparatus forms the image with the use of the image forming substance comprising a wax component of more than or equal to 1 wt % with respect the total weight of the image forming substance.

* * * * *